United States Patent [19]

Erwin et al.

[11] 4,013,999
[45] Mar. 22, 1977

[54] SINGLE READ STATION ACQUISITION FOR CHARACTER RECOGNITION

[75] Inventors: Jerry D. Erwin, Dallas; Dale R. Duvall, Fort Worth; Richard K. Habitzreiter, Dallas, all of Tex.

[73] Assignee: Recognition Equipment Incorporated, Dallas, Tex.

[22] Filed: Dec. 15, 1975

[21] Appl. No.: 640,750

Related U.S. Application Data

[63] Continuation-in-part of Ser. No. 497,703, Aug. 15, 1974.

[52] U.S. Cl. .............. 340/146.3 H; 340/146.3 MA
[51] Int. Cl.² ........................................ G06K 9/12
[58] Field of Search .......... 340/146.3 H, 146.3 AH, 340/146.3 MA, 146.3 AE, 324 A, 174

[56] References Cited
UNITED STATES PATENTS

| | | | |
|---|---|---|---|
| 3,295,105 | 12/1966 | Gray et al. | 340/146.3 H |
| 3,462,737 | 8/1969 | Malaby | 340/146.3 H |
| 3,506,807 | 4/1970 | Malaby | 340/146.3 H |
| 3,683,359 | 8/1972 | Kleinschnitz | 340/324 A |
| 3,903,510 | 9/1975 | Zobel | 340/324 A |

OTHER PUBLICATIONS

Stockdale, "Format Control Apparatus", IBM Tech. Disclosure Bulletin, vol. 9, No. 12, May 1967, pp. 1765–1768.
Kimmel, "Video Buffer for Preprocessing in Char. Rec. Systems", IBM Tech. Disclosure Bulletin, vol. 15, No. 11, Apr. 1973, pp. 3435–3436.
Ascher et al., "An Interactive System for Reading Unformatted Printed Text", IEEE Transactions on Computers, vol. C-20, No. 12, Dec. 1971, pp. 1527–1543.

Primary Examiner—Leo H. Boudreau
Attorney, Agent, or Firm—John E. Vandigriff

[57] ABSTRACT

To read characters printed on a document it is transported beneath a self-scan photocell array extending substantially the entire width of the document. Output signals from the photocells of the array are scanned by a plurality of channels, amplified and converted into a digital data format representing the character patterns. The digital data is then processed to memory electronics and search electronics to select lines of character pattern data for transmission to a character recognition unit. The search electronics compresses the character data into search segments to evaluate the top and bottom position of character lines. Further, the search electronics determines line linkages between the elements of one search segment of compressed data and the elements of the preceding search segments for future processing in a line tracker. The line tracker provides signals to extract character lines from a temporary storage for transmission to a line block memory. When the parameters of selected lines are determined by the line tracker of the search electronics the character data in the line block memory is unloaded into circuitry that functions to select data to be routed to read electronics for processing to a character recognition unit.

8 Claims, 27 Drawing Figures

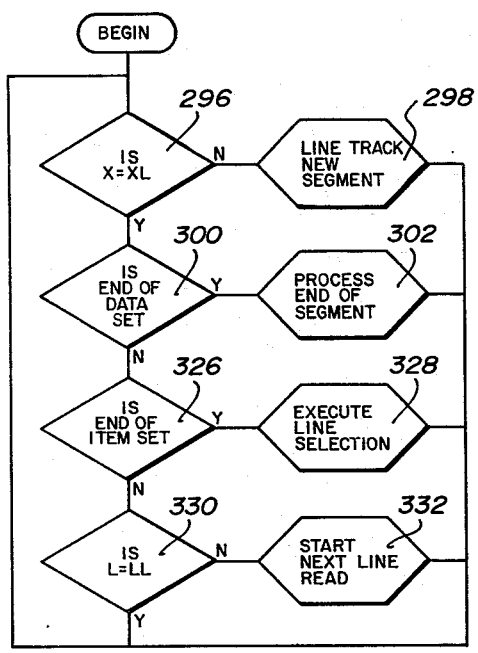
FIG. 14
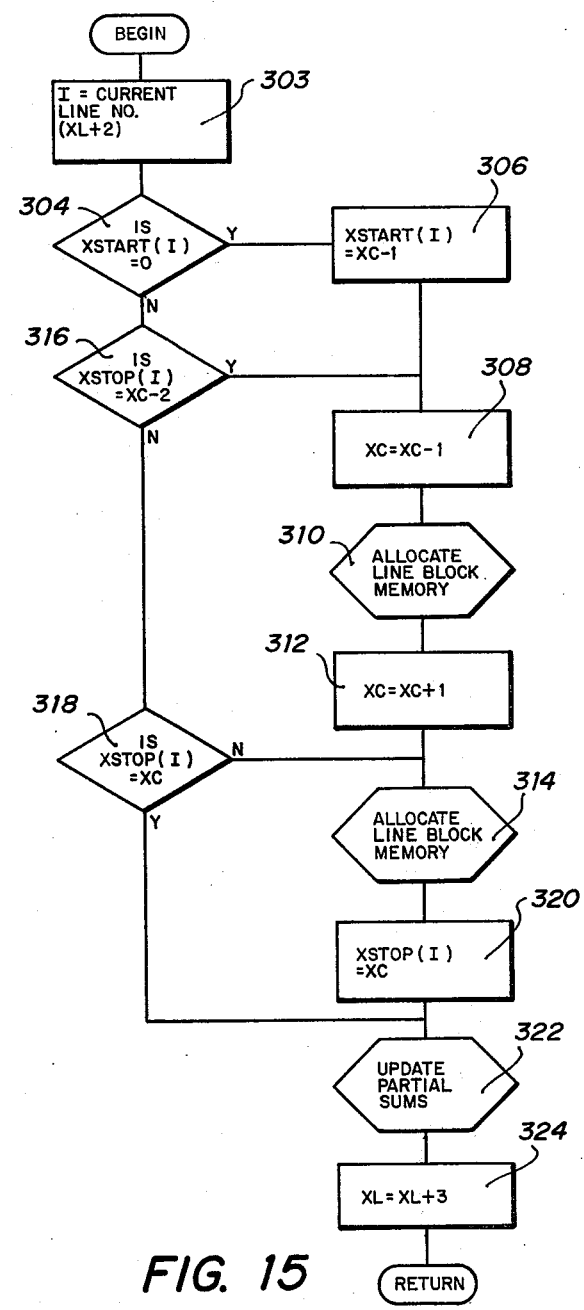
FIG. 15
FIG. 24
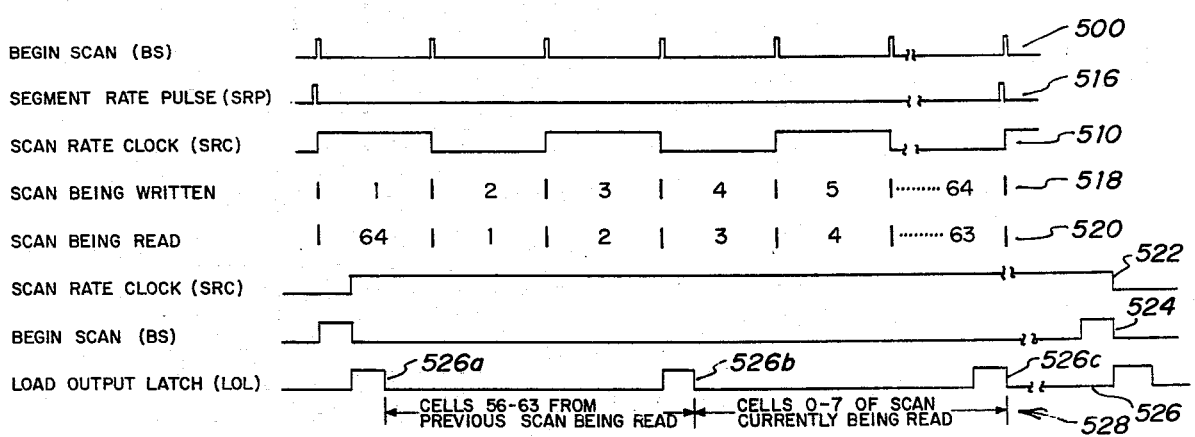

SINGLE READ STATION ACQUISITION FOR CHARACTER RECOGNITION

This is a continuation-in-part of application Ser. No. 497,703, filed Aug. 15, 1974, This invention relates to optical character data acquisition and more particularly to an optical character data acquisition method and system that provides the capability of searching for, acquiring and selecting one or more lines of print on the face of a document in continuous motion.

There are two widely used methods for locating and reading printed lines which appear randomly at any position within a relatively large acquisition area on a document such as letter mail, bank checks or credit card invoices. One of these techniques uses a single scanning device, usually a flying spot scanner, to scan the aquisition area first with a coarse scan to locate the lines of character data; and second with a fine scan to pick up the character image and transduce it into electrical signals for character recognition. This approach requires that the document remain stationary during the scanning sequence so that the subsequent line scan can be related to the character line position data detected during the original coarse scan.

The second commonly used technique accomplishes this same result of providing electrical signals for character recognition on moving documents. In this latter approach, however, two read stations, usually each containing a linear array of photocells necessary to cover a band on the document, are required. The first read station, which is generally called the "prescan" or "search station" picks up the image of the array of character lines for a complete acquisition area. Data from this first read station in the form of electrical signals are processed to determine the location of the character lines within the acquisition area on the document. The resulting line coordinate data is related to control electronics for the second read station located downstream from the first station a distance so as to allow the second read station to respond to a detailed image of the array of character lines to be read. This is accomplished either by mechanically positioning the sensors at the proper vertical position to acess the character lines of interest or electronically, by selecting only those sensor outputs which are at the proper vertical position in a larger linear array of photocells, to detect the selected line in the array of character lines on a document. Horizontal positioning in this second technique is accomplished by switching the sensor output on and off at the proper time with respect to a reference point on the document, usually the leading edge.

A feature of the present invention is to provide a data acquisition system wherein documents are read "on the fly" at a single read station extending transverse of document movement. By reading documents on the fly, a considerable time savings in data acquisition and handling is obtained over stationary document reading with its inherent limitations in speed of document handling, plus the complexity of the document transport required to start, stop and accurately position a document for reading. Another feature of the present invention is thus to provide data acquisition utilizing a simplified document transport without complex document alignment requirements. The dual reading station technique described previously requires considerable complexity in the transport mechanism since the document must be maintained along a very accurate path between the first read station and the second read station, particularly in the vertical plane, since measurements at the first station are applied to controls which set up the second read station from a selected, relatively small area of the document. Still another feature of the present invention is a data acquisition system requiring a minimum of tracking electronics for completing the data acquisition from a moving document. A considerable amount of complex document tracking electronics are required in the two station technique to keep track of and synchronize operations as a document moves in the area between the read stations. This complexity is compounded by the fact that it is likely one document will be at the first read station while another document is moving past the second read station during the reading process.

The present invention is directed to a single read station acquisition system wherein the image of the entire acquisition area of a document to be read is captured as it moves past a single read station. The image data read from the passing document is processed in real time using logic circuitry to detect portions of the acquisition area which are of interest, e.g., the lines of characters to be read from an array of character lines. Utilizing the present invention, it is not necessary to retain the entire image of the acquisition area in memory, but only a portion sufficiently large to allow accurate determination of the parameters required to select the areas (character lines) of interest.

In accordance with the present invention, character image data is processed in real time as a document moves past a read station, and only the data of interest is retained by successive selection of those areas of the character image area of interest for data processing. Two memories are utilized for the character data, each memory more specialized in function than the preceding memory, to contain final character image lines in the last memory of the sequence. The number of memory stages is determined by the number of processing steps required to resolve the final selection and processing of character data prior to the application to a character recognition unit. At each processing step, the image data is selectively reduced to the essence of the information required for a particular processing step. At the same time, the character image data may be altered as it moves from one memory stage to the next.

In accordance with the present invention, an optical scanning system is provided wherein a transducer scans contiguous patterns on spaced lines to provide digitized pattern data simultaneously to a means for storing the pattern data of all the spaced lines scanned by said transducer and to means for searching the patterns from the array of spaced lines to generate line retaining signals and line read signals. Patterns identified by the line retaining signals are transmitted to a storage memory for receiving the pattern data for further processing to circuitry responsive to the line read signals to cause only selected pattern lines to be transmitted to a character recognition unit.

Further in accordance with the present invention, subsequent scans of the contiguous patterns as represented by the digitized pattern data are compressed into search segments for detection of the top and bottom location on each of the spaced lines. These segments are further analyzed to determine their linking relationship between other search segments for further processing to select one or more of the spaced lines of patterns for transmission to a recognition unit.

For a more complete understanding of the invention and its advantages, reference may now be had to the following description taken in conjunction with the accompanying drawings.

Referring to the drawings:

FIG. 14 is a flow chart of the schedule loop of the micro-processor of the search electronics of FIG. 2;

FIG. 15 is a flow chart of the line tracking controller of the micro-processor;

FIG. 24 is a timing diagram of the extraction registers of FIG. 2 for transfer of data between the strip memory and the line block memory;

Figure 1:
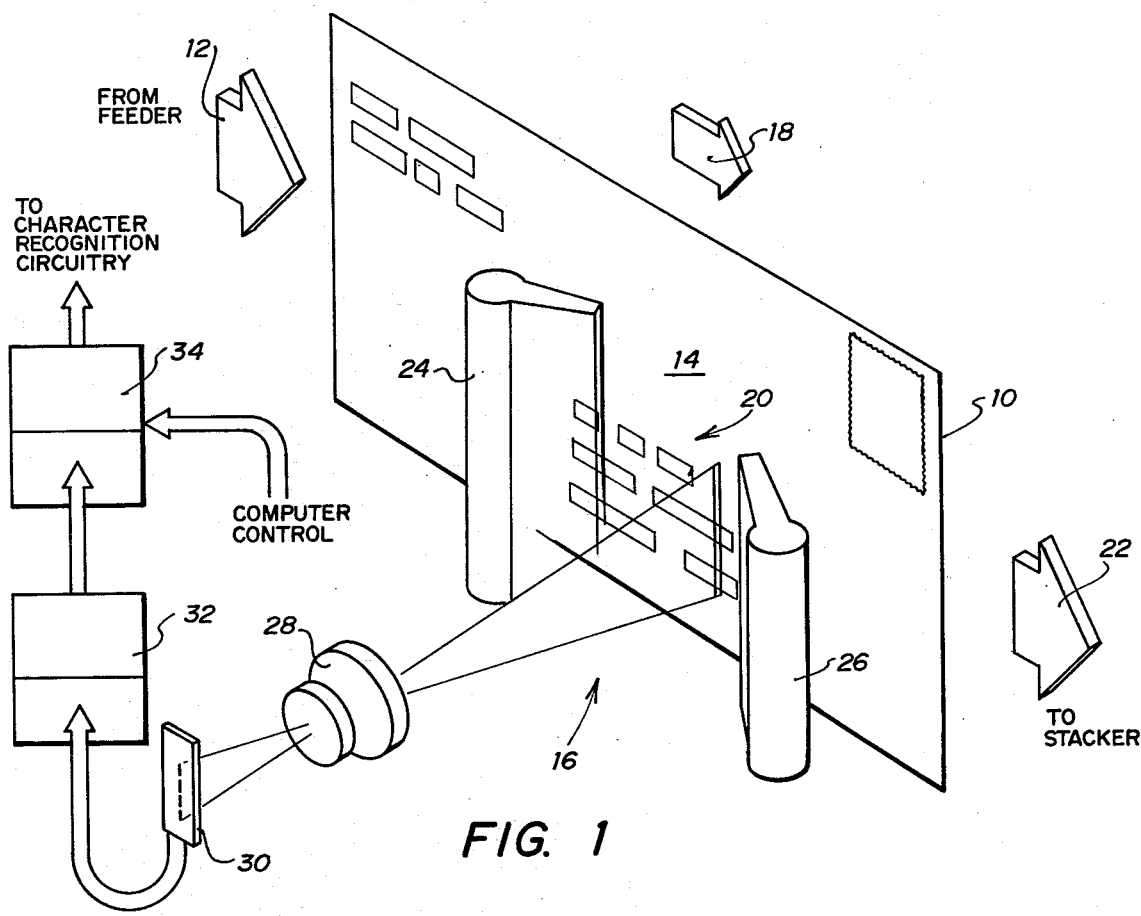
FIG. 1 is a perspective illustration of a letter address scanning system application of the present invention utilizing a single read station.

Referring to FIG. 1, a letter mail envelope or other data bearing document 10 is fed singly and at a high velocity from a document feeding module 12 into a transport system and moved past a field of view 14 of an electro-optical scanning module 16. The document 10 is transported in the direction of an arrow 18 which is generally parallel to an array 20 of character lines being scanned.

After scanning the document 10, it is transported to a sorting and stacking module 22 wherein it is arranged in a preselected group in accordance with the information in the character lines.

An image of the array 20 of character lines extending the length of the document 10 is illuminated by lamp assemblies 24 and 26 and projected by means of a lens assembly 28 onto a photosensitive scanner 30 which may comprise a self-scan photodiode array. Typically, the photodiode array 30 may comprise 512 photodiode to obtain a field of view across a typical document width.

In accordance with standard character reader techniques the photodiode array 30 responds to the incident light level on each of the photodiodes and produces a train of output signals. The output signals of the photodiode array 30 are applied to electronic process circuitry 32, as will be further explained, and after processing applied to electronic memory circuitry 34. Data is output from the memory circuitry 34 to a character recognition unit (not shown) that provides decision signals which are input to a computer for utilization.

Figure 2:
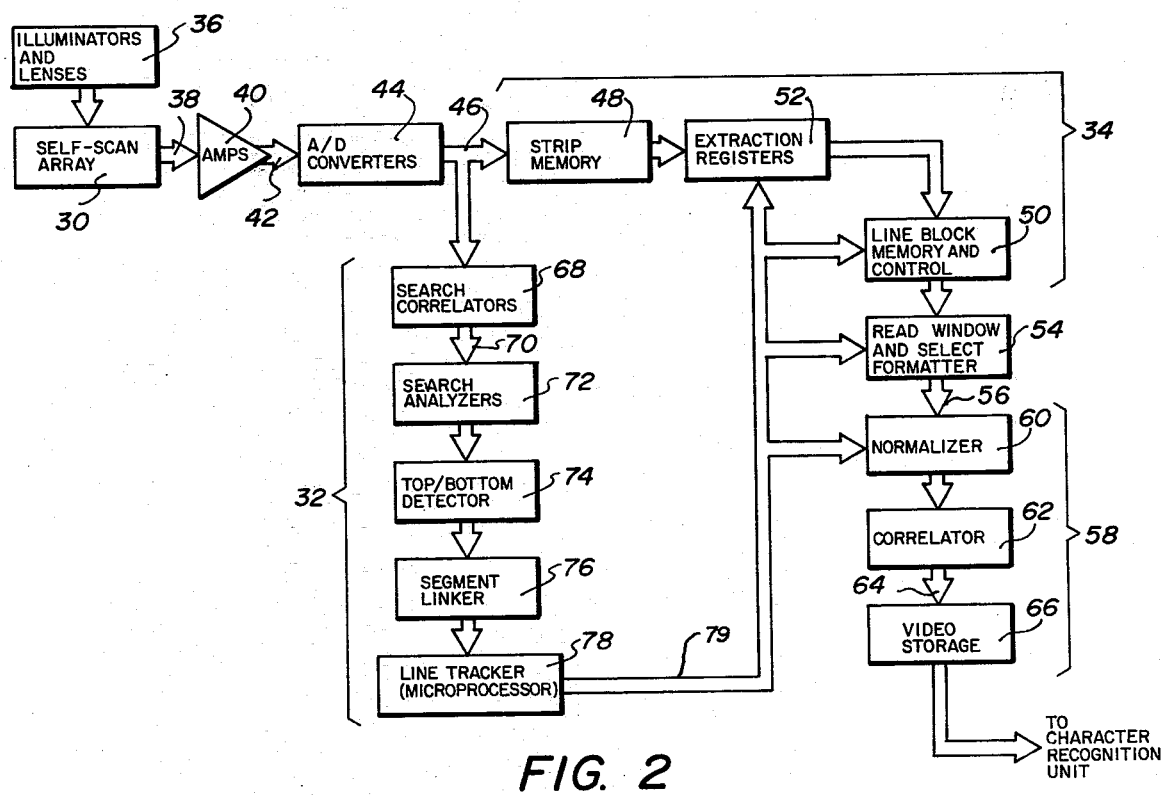
FIG. 2 is a block diagram of a single station video acquisition system including video electronics, search electronics, memory electronics and read electronics.

Referring to FIG. 2, there is shown a block diagram of the video, search, memory and read electronics of an optical character processing system of the present invention. The lamp assemblies 24 and 26 and the lens assembly 28 are represented by block 36 with patterns on the spaced lines 20 projected to the self-scan photodiode array 30. The lens assembly 28 is arranged to intercept the entire array of spaced lines 20 of patterns on the surface of the document 10. An image of the pattern line array is projected through the lens assembly 28 onto the surface of the self-scan photodiode array 30. Data from the self-scan photodiode array 30 is input over a channel 38 to high gain operational amplifiers 40. Typically, the high gain operational amplifiers 40 may comprise an integrating amplifier having a capacitor feedback configuration from the output of the amplifier to the input channel 38.

The output of the operational amplifiers 40 is coupled by means of a channel 42 to the input of analog-to-digital converters 44. At the output of the analog-to-digital converters 44 there is produced a serial stream of four bit data words which are digital equivalents of the photodiode output signals from the array 30. The data word output rate from the analog-to-digital converters 44 is the same as the scanning frequency of the photodiode array. Preferably, the digital word "0000" is assigned as being the output condition of the analog-to-digital converter when a photodiode views a completely white area, and the digital word "1111" is the output when a completely black area is viewed.

The analog-to-digital converter 44 may include a chain of dropping resistors connected to respective level detectors each of which is connected to a reference voltage. In operation, pulses of analog video data comprising current waveforms are input to the analog-to-digital converter 44 and a four bit digital representation of the analog value is obtained on a channel 46. By virtue of integration, the photocurrent time average is obtained for the sample region of each of the character patterns in the spaced line array 20. The digital pulses on the channel 46 are representative of one of sixteen possible "gray levels" extending from black pattern signals to white pattern signals.

Digitized video signals on the channel 46 are routed simultaneously to the memory electronics 34 and the search electronics 34. With reference to the memory electronics 32, digitized pattern data is input to a strip memory 48 consisting of an array of serial buffer registers having storage capability sufficient to retain each line of character patterns in the spaced lines 20. Functionally, the strip memory 48 acts as a video delay to allow time for the search electronics 32 to find the approximate location of potential lines for future processing.

When the location of identifiable lines in the strip memory 48 is determined only the stored video data relating to the identifiable lines is retained for future processing. Data relating to the identifiable lines of character patterns is transferred from the strip memory 48 to a line block memory controller 50 by means of an extraction register 52. The line block memory controller 50 consists of a random access memory with the extraction registers 52 comprising standard gating logic.

While the lines of character patterns of interest are stored in the line block memory 50, additional information is determined about the character patterns and lines from the video data by means of the search electronics 32. This additional information includes a decision as to what memory elements of the line block memory 50 contain lines of patterns to be transferred to the recognition unit 58 along with the necessary parameters of the lines to be read. As will be explained, the parameters determined by the search electronics 32 also include starting and stopping locations of a line on the document 10, the typical line height (referred to as a normalization factor) and the location of the line bottom (representative of the beginning line bottom and skew angle).

When all of the parameters of the lines of interest in the line block memory 50 have been determined, data representing the lines of interest is unloaded from the memory 50 into a window select and formatter 54 as the output stage of the memory electronics 34. The select and formatter 54 selects the portion of the line block memory 50 which contains digitized video information immediately surrounding the character pattern of the lines of interest, otherwise identified as a data block. This selected digitized video information is then transferred over the channel 56 to the read electronics 58.

Selected line data on the channel 56 is initially input to a normalizer 60 that performs image normalization in both the vertical and horizontal directions, thereby allowing the overall video field to be reduced to a selected size. Such character data normalization is accomplished in accordance with standard normalizer techniques. In addition, the normalizer in conjunction with the window select and formatter 54 performs skew correction to remove the slope of the selected line as read from the document 10.

The output of the normalizer 60 is input to a correlator 62 which evaluates the gray level data on the channel 56 into black or white digital character signals. The result in a serial data stream on a channel 64 of digital video information of one bit per cell in the photodiode array 30. The black character data and the white character data are input and stored in a video storage 66 for serial presentation to a character recognition unit. Both the correlator 62 and the video storage 66 are conventional character recognition components.

Simultaneous with the routing of video data of each scan of the document 10 to the strip memory 48, the same data is also routed to a search correlator 68 which converts the four bit video data into a single bit black/white decision on an output channel 70. The black/white video data on the channel 70 is transmitted to a search analyzer 72 performing the function of compressing video pattern data from multiple search scans into a single search segment. For example, every other scan of sixty-four search scans made by the array 30 are compressed by the analyzer 72 into a single search segment. These segments then become the smallest element of horizontal resolution utilized in the system to determine actual line position.

Each search segment of the anaylzer 72 is routed to a top/bottom detector 74 wherein the individual segments are analyzed for vertical video patterns which represent the location of potential lines within each respective segment. The output of the detector 74 is thus a top/bottom signal pattern representing the relative position of tops and bottoms of potential lines within each of the search segments compiled by the anaylzer 72. These top/bottom signals are transmitted to a segment linker 76 having the function of determining top/bottom information from successive search segments belongs to the same line of character patterns on the document 10. Signals representing linking lines of adjacent search segments and the top/bottom position signals from the detector 74 are routed to a line tracker microprocessor 78. The microprocessor 78 evaluates to various potential lines of character patterns to determine which are to be gated from the strip memory 48 into the line block memory 50. Further the microprocessor 78 functions to determine which of the retained lines in the line block memory 50 are to be read and further calculates the parameters, as discussed previously, of the video data transferred to the window select and formatter 54 and subsequently to the read electronics 58. Further, the line tracker microprocessor 78 performs a bookkeeping function to track in what memory elements that portions of lines of data in the memory 50 are located. Signals generated by the microprocessor 78 are coupled by means of channels 79 to the extraction registers 52, the line block memory controller 50, the window select and formatter 54 and the normalizer 60.

The video acquisition system of FIG. 2 represents a two line read system, although any number of spaced lines on a document 10 may be identified and select for routing to a character recognition unit. An example of a two line reading technique accomplished by the system of FIG. 2 is shown in FIG. 3 wherein the document 10 includes three spaced lines of identifiable character pattern in an array 20.

As illustrated, the document 10 has already moved past the scanning module 16 with the scan column 80 containing video data located on the channel 46 for routing to the strip memory 48 and the search correlators 68. The video data of the scan column 80 is input into the strip memory 48 that, in the example, already stores video data of scan columns contained within the area 82. At the output of the strip memory 48 video data from the scan column 84 is being gated by the extraction registers 52 into the line block memory 50.

As previously mentioned, the line block memory controller 50 is a random access memory with individually addressable storage elements for retaining a block of video data lifted from the spaced lines of the document 10 where each block of video data has been lifted from one line and consists of multiple scans by the photodiode array 30. Each storage element of the line block memory 50 stores video data as lifted from one of the blocks in the array 20 on the document 10 of FIG. 3. Selected blocks of video data identified on the document 10 for storage in an element of the block memory 50 is separately identified by one of the reference numerals 86-95 for purposes of this description. That portion of the scan column 84 presently being written into a storage element (identified by the number 87) of the line block memory 50 is represented by the reference numeral 96. At the same time, portions of the same scan 84 are being written into elements 86 and 95 of the line block memory 50. That portion of the scan 84 identified with the reference numeral 98 is being written into the storage element 86 and that portion of the scan 84 identified by the reference numeral 100 is being written into the storage element 95. Other video data within the blocks 86, 87 and 95 have already been stored in numbered elements of the random access memory of the block memory controller 50. Each storage element of the memory 50 is loaded with video data on a scan by scan basis.

Figure 3:
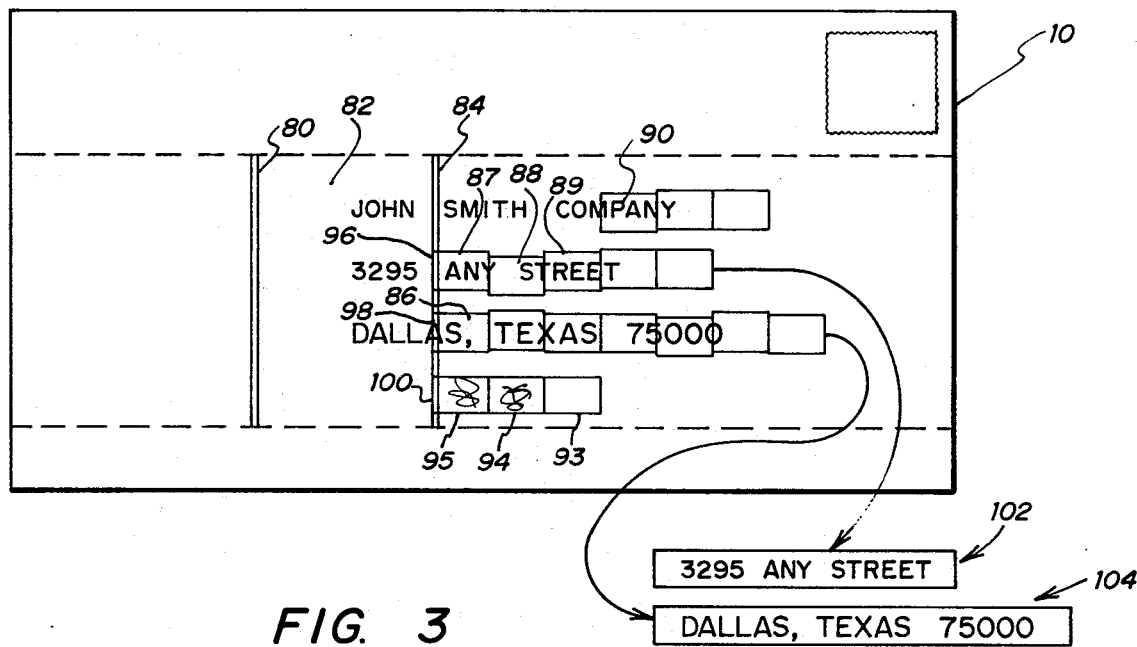
FIG. 3 is an illustration of a document containing three spaced lines of character patterns showing the video capture technique of the present invention.

All blocks illustrated on the document 10 of FIG. 3 represent video data previously stored in the block memory 50. Each block represents data stored in a particular element of the random access memory. The blocks 93, 94 and 95 illustrate areas of video data captured and stored in the block memory 50; however, these blocks of data will not be gated out of the block memory 50 because the line tracking microprocessor 78, when evaluating the video data within these blocks, determines that insufficient information is contained within the blocks to be identified as a line of character patterns.

Although the system presently being described represents a two line read system, three space lines of character patterns are retained simultaneously in the line block memory controller 50 thereby enabling the system to recover from any error made by capturing video data as represented by the blocks 93, 94 and 95. If only two lines of data had been retained, then the video data in the blocks 87, 88 and 89 would have been lost as in the case of the video data to the right of the block 90.

After processing the video data lifted from the document 10 in accordance with the operation of the system of the present invention, the lines 102 and 104 will be read out from the line block memory 50 after the entire document 10 has been scanned and all parameters of the data have been established.

Figure 4:
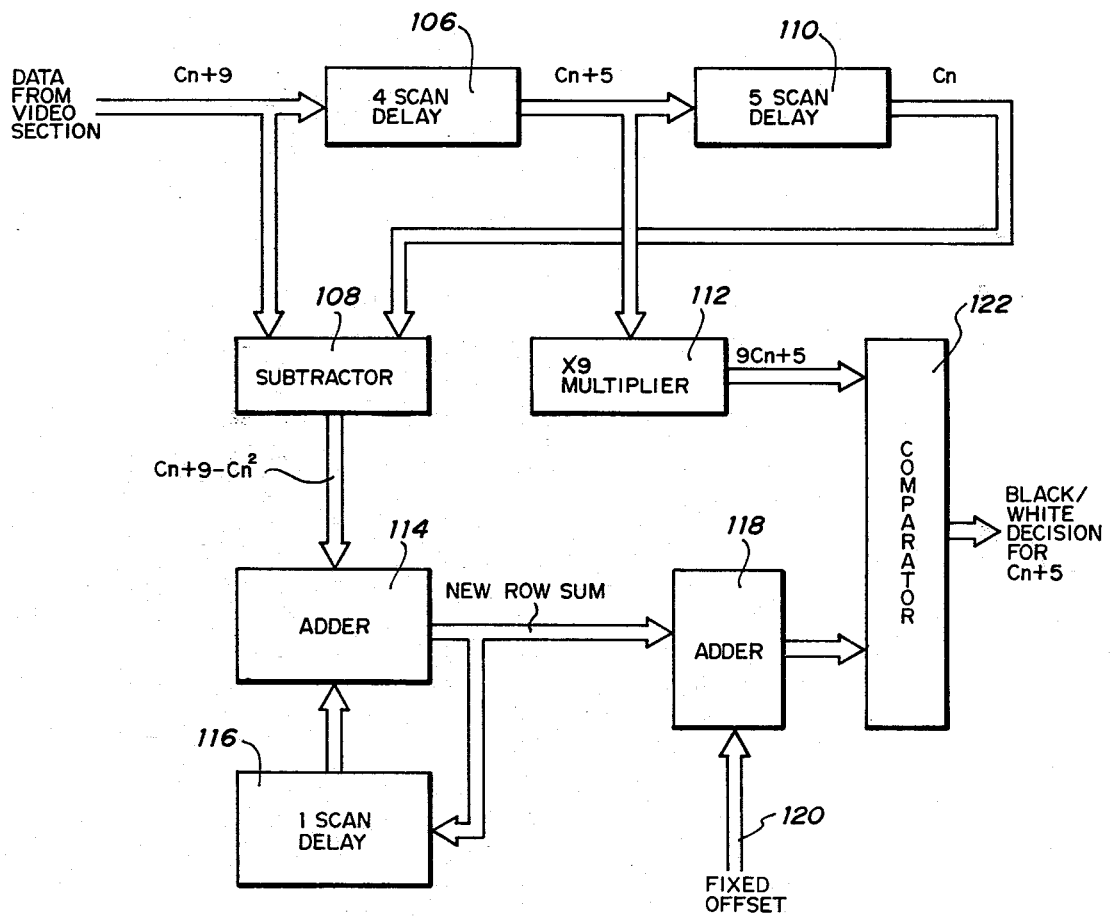
FIG. 4 is a block diagram of the search correlator logic of the search electronics of FIG. 2.

To deterime the parameters of the video data within the blocks of the document 10 as shown in FIG. 3 and stored in memory elements of the block memory 50, video data on the channel 46 is initially applied to the search correlators 68 comprising logic elements as shown in FIG. 4. Serial video cell data from the analog-to-digital converter 44 is routed over the channel 46 into a four scan delay register 106 and simultaneously applied to an input of a subtractor 108. Delayed data from the register 106 is simultaneously applied to a five scan delay register 110 and a (X9) multiplier 112. An output of the five scan delay register 110 is applied to a second input of the subtractor 108.

An output from the subtractor 108 is applied to an adder 114 that provides an output to a one scan delay register 116 in a feedback loop connected to a second input of the adder 114. An output from the adder 114 is also applied to an adder 118 that receives a fixed offset signal on a channel 120. An output from the adder 118 is applied to a comparator 122 with the second signal to the comparator routed from the output of the (X9) multiplier 112. An output of the comparator 122 is a signal indicating either a black or a white condition for a particular cell of the array 30.

To make a black/white decision for each cell in the array 30, the sum of nine consecutive samples of each cell are utilized to determine if the middle cell of the sum is to be called white or black. This sum is referred to as the row sum. If $C_n$ represents the value of cell C during scan $n$, then $C_{n+5}$ is black when $9C_{n+5} >$ $$\sum_{i=n+1}^{n+9}$$

$C_i + 10$, where $C_{n+5}$ is the center cell. When the criterion for a black decision is not present for the cell $C_{n+5}$, then this cell is determined to be white.

What the above algorithm implies is that when a cell is slightly darker than the average value of that cell for four samples on either side of the cell under observation, then the cell is determined to be black. The constant 10, applied to the channel 120, provides the offset in the example described above.

In order to obtain the center cell and the cells required for obtaining the row sum, data from the cell under observation is applied to the four scan delay registers 106 and subsequently to the five scan delay register 110. The row sum associated with each center cell is updated each scan time by first subtracting in the subtractor logic 108 the value of the oldest cell, $C_n$, which value appears at the output of the scan delay register 110, from the value of the newest cell, $C_n**_9$, which is the value of the cell data applied to the scan delay register 106 and the second input of the subtractor 108. The difference between the two inputs to the subtractor 108 is equal to the value of the video data of the cell $C_{n+9}$ minus the value of the video data for the cell $C_n$. This difference is applied to the adder 114 wherein it is added to the previous row sum as appearing at the output of the one scan delay register 116. Mathematically the output of the adder 114 is expressed as follows:

$$\text{New Row Sum} = \sum_{i=n+1}^{n+9} C_i = \sum_{i=n}^{n+8} C_i + (C_{n+9} - C_n)$$

This process updates the row sum for each cell on a scan-by-scan basis.

The update of the row sum is then added to a fixed offset in the adder logic 118, the offset appearing on the channel 120. The summation of the new row sum with the offset added thereto is then compared to the center cell multiplied by 9, $9C_{n+5}$, in the comparator 122. The value of the video data for the center cell, $C_{n+5}$, is obtained from the output of the four scan delay register 106 as is supplied to the multiplier 112. The center cell value is multiplied by 9 in the multiplier 112 providing the second input to the comparator 122.

If the value of the center cell times 9, $9C_{n+5}$, is greater than the row sum plus offset at the output of the adder 118, the resultant black/white decision for the center cell $C_{n+5}$ is black. If the output of the multiplier 112 is less than the output of the adder 118, then this criterion is not met and the center cell $C_{n+5}$ is determined to be white. Using the search correlator logic of FIG. 4, a decision for each cell in one scan of the document 10 is made for each scan time.

Referring to FIG. 2, black and white data from the output of the correlators 68 appears on the channel 70 and is applied to the search analyzer 72. The search analyzer 72 compresses all the black and white data in each of a plurality of adjacent scans from the search correlators into a single search segment of black and white data. As implemented in one embodiment of the present invention, the search analyzer compressed every other scan of sixty-four search scans into a single search segment.

To achieve this compression, the black/white cell data at the output of the comparator 122 (FIG. 5) of the correlator 68 is applied simultaneously to an input of a scan delay register 124 (a shift register) and one input of an AND gate 126. The scan delay register 124 provides a delay of one scan time to produce an output connected to the second input of the AND gate 126. Thus, black/white cell data from the search correlator 68 is ANDed with the corresponding cell data of the previous scan in the AND gate 126. When the value of the incoming cell data and the value of the corresponding cell of the previous scan are both black data, the output of the AND gate 126 will be at a black data level and the cell under consideration will now be considered black for the entire search segment.

The logic decision at the output of the AND gate 126 is applied to an OR gate 128 for routing to a scan delay register 130 (a shift register). An output of the shift register 130 is applied to one input of a selector gate 132 having a second preset input at the white logic level. An output from the selector 132 is applied to the second input of the OR gate 128. Thus, the OR gate 128 logically ORs present black level data from the gate 126 with any previous black level data from the selector gate 132 such that one a black decision for any cell has been obtained, it is retained in the delay register 130 for the entire search segment.

At the beginning of each search segment, for example, the first scan of sixty-four successive scans, the accumulated black/white data in the delay register 130 from the previous segment compilation is routed into a segment storage register 134 through a selector gate 136. During this transfer operation, the selector gate 132 shifts from the scan delay 130 to the second input to provide a white level signal to the OR gate 128 thereby isolating incoming video data (new search segment) applied to the AND gate 126 from the data (previous search segment) being transferred to the shift register 134.

Upon completion of the transfer of the search segment data from the delay register 132 into the shift register 134 the selector gate 136 transfers to the second input thereto on the line 138 to interconnect the vertically adjacent section of a search segment with the section of the search segment in the register 134. In this manner, multiple segment storage shift registers, one for each search section, are linked together serially to enable the data stored in each such shift register 134 to be linked together and shifted along the output line 140 into the top/bottom detector 74.

Figure 5:
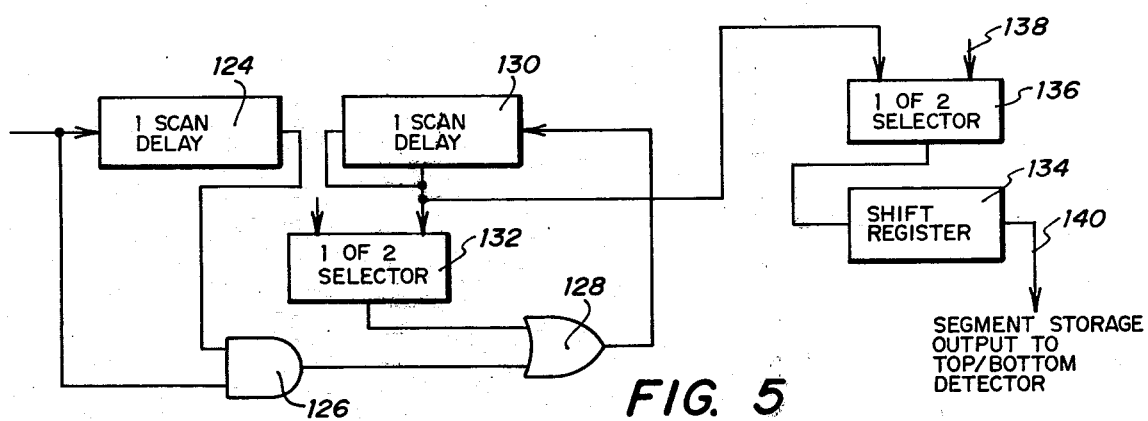
FIG. 5 is a block diagram of the search analyzer of the search electronics.

From the above, it should be understood that the logic of FIG. 5 is duplicated several times to achieve data compression in one time frame for the total number of cells in one scan. The cells of one scan are separated into search sections which are gated in series through shift register 134 to the line 140.

Figure 6:
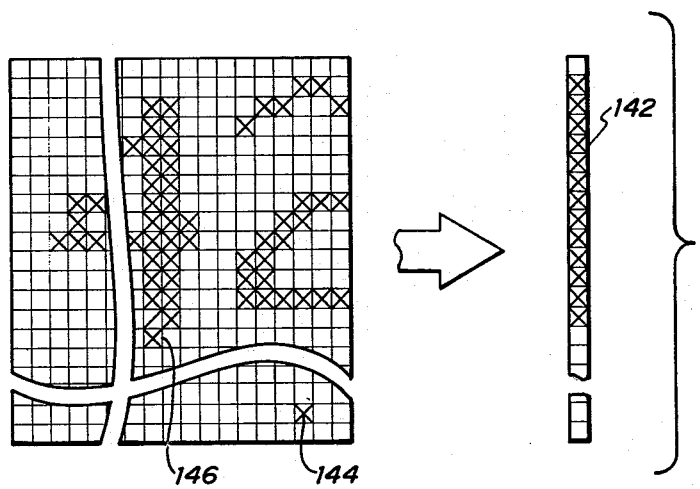
FIG. 6 is an illustration of the effect of the search analyzer compression of data from the search correlator from 32 scans into a single search segment.

Referring to FIG. 6, there is shown an illustration of the effect of the search analyzer of FIG. 5 for compressing data from sixty-four search scans, each scan comprising 64 cells, into a single search segment 142. For any cell in the segment 142 to be at a black level, two consecutive cell samples in the thirty-two search scans used out of sixty-four scans must be black. Thus, the cell 144 does not produce a black cell in the search segment 142. Likewise, the cell 146 does not produce a black cell in the search segment. In all other rows of cell data from the thirty-two search scans utilized, where a black level signal appears, there are two consecutive such black level signals thereby producing a black cell in the search segment 142.

Figure 7:
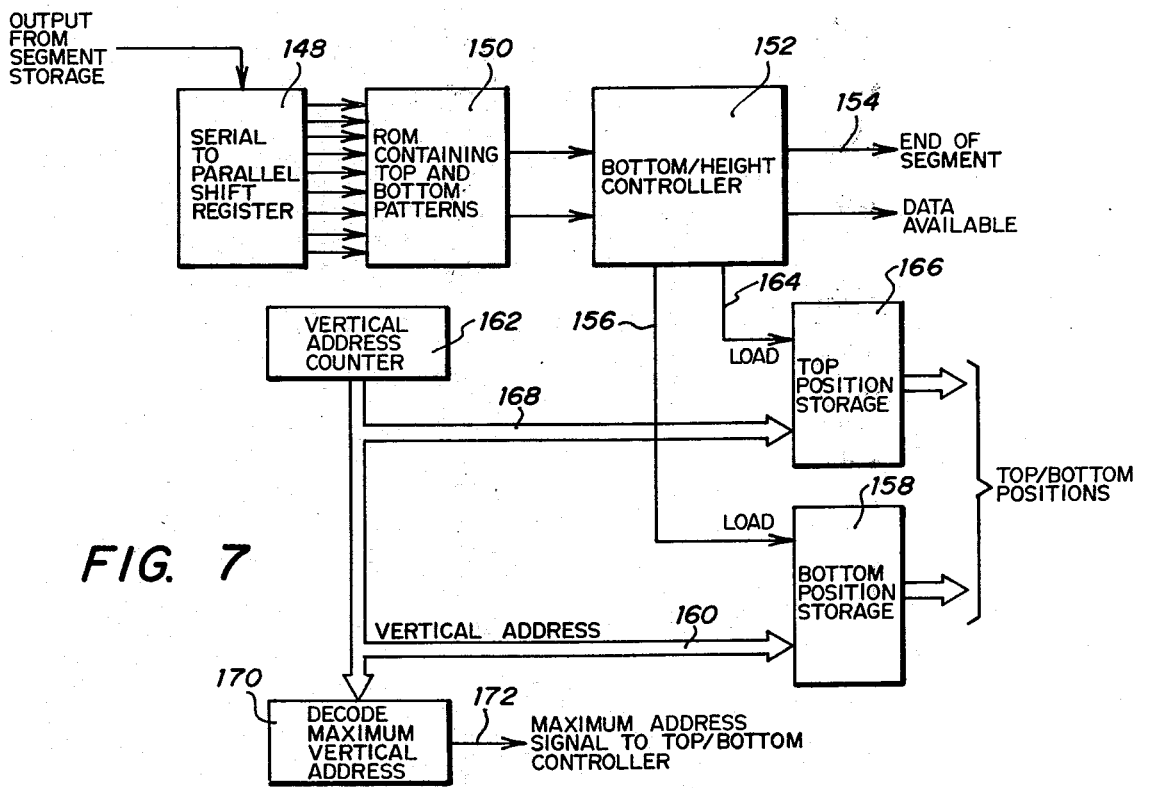
FIG. 7 is a block diagram of the top/bottom detector logic of the search electronics of FIG. 2.

Referring to FIG. 7, there is shown a logic schematic for the top/bottom detector 74 that receives results of the data compression at the end of each search segment from the register 134 at the input of a serial-to-parallel shift register 148. The output signals from the register 148 represent nine vertically adjacent cells in the search segment. These output signals are applied to a read only memory 150 that decodes the pattern of black and white cell data from the shift register 148 into top or bottom cell position. In the read only memory 150 the pattern of black/white cell data in the register 148 is decoded in accordance with the truth table of Table I.

TABLE I

| CELLS | ACCEPTABLE PATTERNS FOR BOTTOM AT K | | | | | | | | | PATTERN FOR TOP AT K |
|---|---|---|---|---|---|---|---|---|---|---|
|  | 1 | 2 | 3 | 4 | 5 | 6 | 7 | 8 | 9 |  |
| K+6 | 1 | 1 | 1 | 1 | 0 | 1 | 1 | 1 | 0 | X |
| K+5 | 1 | 1 | 1 | 0 | 1 | 1 | 0 | 0 | 1 | X |
| K+4 | 1 | 1 | 0 | 1 | 1 | 0 | 0 | 1 | 0 | X |
| K+3 | 1 | 0 | 1 | 1 | 1 | 0 | 1 | 0 | 1 | O |
| K+2 | 1 | 1 | 1 | 1 | 1 | 1 | 1 | 1 | 1 | O |
| K+1 | 1 | 1 | 1 | 1 | 1 | 1 | 1 | 1 | 1 | O |
| K | 1 | 1 | 1 | 1 | 1 | 1 | 1 | 1 | 1 | 1 |
| K−1 | 0 | 0 | 0 | 0 | 0 | 0 | 0 | 0 | 0 | X |

K = Vertical Cell Position
1 = Black
O = White
X = Don't Care

To decode the pattern of top/white cell data in the read only memory 150, a controller 152 scans the pattern of data in the read only memory to determine the bottom position of potential lines in the register 148. The controller 152 enables a search of the patterns in the read only memory 150 and when the first bottom position is detected, an input is applied to the controller 152 to generate a load signal along a line 156 to a bottom position storage register 158. This load signal enables the register 158 for storage of a vertical address received along a channel 160 from a vertical address counter 162. Thus, there is stored in the storage register 158 the address of a bottom position for a potential line in the strip memory 48.

After this first bottom address is loaded into the register 158, the controller then enables a top of line search of the read only memory 150, ignoring any additional detected bottoms. When a top is detected in accordance with the truth table of Table I, the controller 152 generates a load signal on a line 164 to a top position storage register 166. The load signal enables the vertical address of the line top to be applied to the register 166 over a channel 168 from the vertical address counter 162.

Operation of the entire system is sequenced in accordance with a series of clock pulses. After loading a bottom vertical address in the register 158 and a top vertical address in the register 166, this data is routed to the segment linker 76 and the controller 152 is again actuated to initiate a search for the next bottom of a potential line in the memory 150. In this manner, the bottom vertical position and top vertical position of each potential line in the read only memory 150 are identified to generate a vertical address in the storage registers 158 and 166. The vertical address counter 162 provides the position of the detected top and bottoms.

After all the data shifted into the register 148 has been evaluated for top and bottom line position, the counter 162 is reset as the next segment data is shifted to the register 148 and to the read only memory 150. The vertical address counter 162 is incremented one address location each time data from a cell is shifted into the register 148. Thus, the output of the vertical address counter 162 is representative of the position of any cell being analyzed in the read only memory 150.

As a further operation of the controller 152, a count is made of the number of top/bottom pairs loaded into the registers 158 and 166. The controller 152 continues to operate in the manner described until the maximum number of top/bottom pairs are counted (typically five top/bottom pairs) or until all the input data for a given search segment from the register 134 has been analyzed. To determine the latter condition, that is, when all the input data for a given search segment has been analyzed, the output of the vertical address counter 162 is applied to a vertical address count register 170. The register 170 produces a signal on a line 172 that is applied to the controller 152 when the vertical address of the counter 162 represents the maximum height of the search segment. When the controller 152 is sequenced to the maximum number of possible top/bottom pairs in the segment or a signal is generated by the register 170 an end of segment signal is generated on a line 154 which is applied to the logic of the segment linker 76 to identify that all top/bottom data from a particular search segment has been output from the registers 158 and 166.

Figure 8:
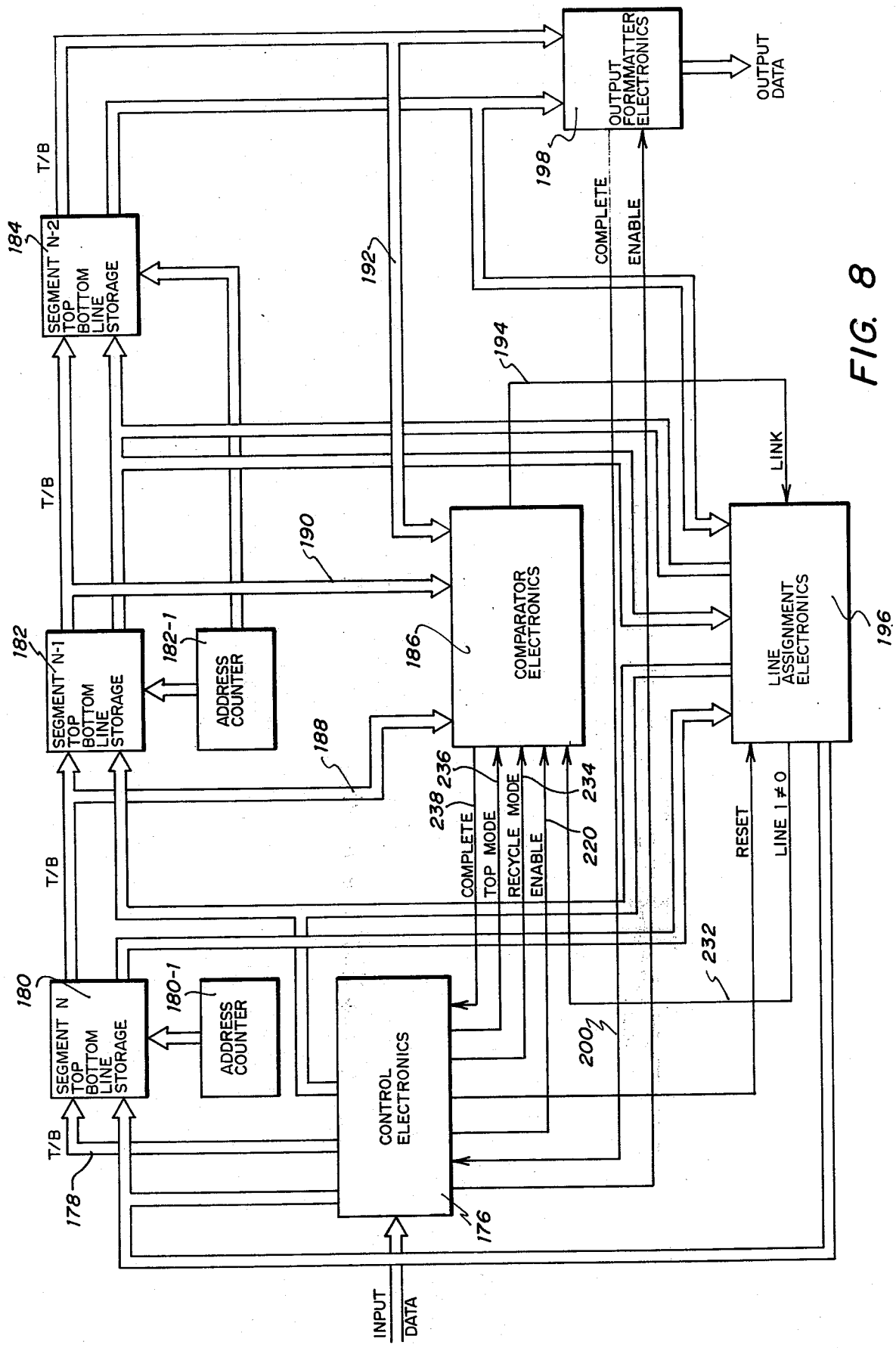
FIG. 8 is a block diagram of the segment linker logic of the search electronics of FIG. 2.

Referring to FIG. 8, vertical address data for the tops and bottoms of potential lines of patterns as transferred from the registers 158 and 166 are input to control electronics 176 of the segment linker 76. Input data applied to the control electronics 176 is routed over a channel 178 into a segment N line storage register 180. Each time the top/bottom address data for an identifiable line is transferred to the storage register 180, an address counter 180-1 is increment one address. The next top/bottom data is then input to the new address, and this operation continues until all top/bottom data pairs for a search segment are input to the storage register 180. When the next vertically adjacent search segment is input to the electronics 176, the data stored in the register 180 is transferred to a segment N-1 storage register 182 at address location identified by incrementing a counter 182-1. Likewise, each time the electronics 176 receives top/bottom address data for the next vertically adjacent search segment data in the register 182 is transferred to a segment N-2 storage register 184.

For each transfer of address data to the registers 180, 182 and 184, an enable signal is generated to a comparator 186 that receives the data transferred between the registers and also data transferred from the register 184 over channels 188, 190 and 192, respectively. The comparator 186 responds to the top/bottom address data from the storage registers 180, 182 and 184 and makes tolerance comparisons between the address data to generate an enable signal on a channel 194 to line assignment electronics 196.

The line assignment electronics 196 responds to the enabling signal to generate line numbers applied to the storage registers 180, 182 and 184.

Each of the three storage registers 180, 182 and 184 consists of a random access memory typically having a six word storage capability for fine top/bottom data pairs and an end-of-segment data word. Each word of the memory contains a 9-bit bottom, a 9-bit top and a 4-bit line number bit. The register 180 is addressed by a counter that generates a signal to select the next available memory word location for incoming data. The registers 182 and 184 are addressed by a single counter with the counters for the registers 180, 182 and 184 reset by the control electronics 176.

Each line number signal that is generated by the line assignment electronics 196 is stored at the appropriate word address of the storage registers 180, 182 and 184. The line assignment electronics 196 receives as inputs the line numbers output from the registers 180, 182 and 184 for comparison purposes to generate a new line number signal.

Output data from the storage register 184 including top/bottom address data and line number address data is routed to an output formatter 198 that converts the input data thereto to height/bottom/line address data and provides outputs relating to the data to the line tracking microprocessor 78. The formatter 198 is enabled by a signal from the control electronics 176 and generates a "complete function" signal on a line 200 to the electronics 176.

Figure 9:
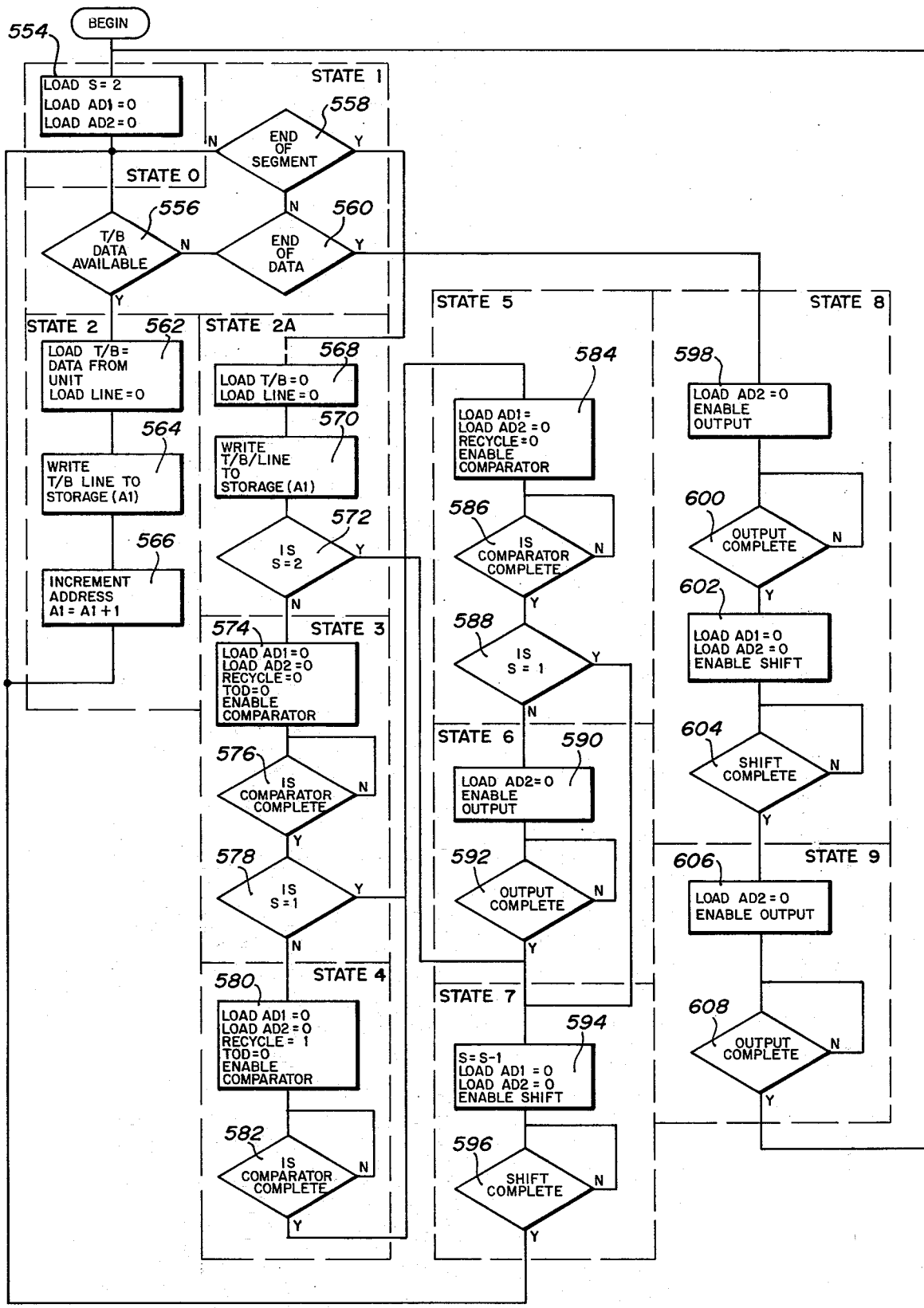
FIG. 9 is a flow chart of the sequence of operation of the control electronics of the segment linker logic of FIG. 8.

Referring to FIG. 9, there is shown a flow chart of the control electronics 176 as part of the block diagram of FIG. 8. The control electronics 176 operates in ten states that sequences the operation of the segment storage registers 180, 182 and 184, the comparator electronics 186, the line assignment electronics 196 and the output formatter 198. During state "0", the control electronics 176 is reset at the start of the document 10. Also, the segment counter is loaded to a count of two and the address counters 180-1 (AD1) and 182-1 (AD2) (see FIG. 10) are cleared to zero in the step 554. The controller then advances to state 1.

In state 1, the control electronics 176 is retained in a ready state for the next operation which will be initiated by the controller receiving top/bottom address data available signal, or an end of data signal, or an end of segment signal from the top/bottom detector 74. State 1 comprises the inquiries 556, 558 and 560 which continually circulate until one of the above three mentioned signals is input to the control electronics 176.

Depending on the signal received, the control electronics advances to either state 2, state 2A or state 8. State 2 is entered when the controller receives the top/bottom address data available signal. The controller advances to a state 2A upon receipt of an end of segment signal and advances to state 8 when receiving an end of data signal.

When the controller advances to state 2, the sequence of operation advances to step 562 during which address data is read from the top/bottom detector 74 and routed into the segment storage 180. A top/bottom data pair and a zero line number are read during the step 562 and written into the currently addressed memory word element of the storage register 180 during a step 564. The address counter 180-1 is incremented to the address of the next memory element during a processing step 566. After incrementing the address counter 180-1 the control electronics 176 returns to state 1 and if another top/bottom data pair is available the sequence again returns to state 2. Another top/bottom data pair is input to the storage register 180 along with a zero line number at the current address location. The address counter 180-1 is again incremented during step 566 and the sequence returns to state 1.

The above sequence continues until an end of segment signal is received by the control electronics when in state 1 at which time the sequence advances from the inquiry 558 to state 2A. In this state an all zero word is loaded from the top/bottom detector 74 in a step 568 and written into the segment storage register 180 during a step 570 at the current address of the counter 180-1. The all zero word written into the storage register 180 is utilized by the comparator electronics 186 and the output formatter 198 as an end of data indicator for a search segment.

Following the step 570, the state 2A advances to an inquiry to determine if the data last input to the storage register 180 is from the first search segment compiled from data read from the document 10. If the last segment input to the storage register 180 is the first search segment, then the control electronics sequence advances to state 7. Otherwise, the inquiry 572 advances the sequence of the control electronics 176 to state 3.

State 3 of the control electronics 176 is the normal comparator state wherein the comparator electronics 186 is enabled during a step 574. During the step 574 the recycle mode signal on the line 234 (FIG. 8) is zero and the top recovery mode signal on the line 236 is likewise zero. Also, the address counters 180-1 (AD1) and 182-1 (AD2) are reset to zero. The control electronics 176 cycles in state 3 until the comparator operation is complete at which time the inquiry 576 advances the sequence to an inquiry 578. The comparator mode of operation is enabled by an "enable" signal on the line 220.

From the inquiry 578 the sequence advances to either state 4 or state 5. The sequence to state 4 when the last received search segment (S ≠ 1) is not the second search segment compiled from data lifted from the document 10. If the last search segment (S = 1) input to the segment linker 76 is the second segment compiled from the document 10, then the sequence advances to state 5.

When sequenced to state 4, the recycle mode signal is generated on the line 234 to enable the comparator electronics 186 into a recycle mode. Also, the address counters 180-1 (AD1) and 182-1 (AD2) are reset to zero and the top recovery mode signal on line 236 is zero. The controller continues in state 4 until an inquiry 582 indicates that the comparator operation is complete. The sequence then advances to state 5.

State 5 is entered either from state 3 or state 4 and is the top address comparator state. In state 5, the comparator electronics 186 is enabled in the top mode by a top recovery mode signal generated on the line 236 and applied to the selector gates 202 and 206 (see FIG. 10). The address counters 180-1 and 182-1 are reset to zero and the recycle mode signal is also zero. The comparator is enabled in a step 584 and continues until an inquiry 586 produces a result indicating the top comparator recovery mode is complete whereby state 5 advances to an inquiry 588. If the last input segment to the segment linker 76 is the first search segment (S = 1) compiled from the document 10, then the control electronics sequence advances to state 7. If the last input segment is not the first search segment (S ≠ 1), then the next state for the control electronics is state 6.

In state 6 the data on the search segment in the storage register 184 is output to the line tracker microprocessor 78. Initially in state 6, the output formatter electronics 198 is enabled in a step 590. The electronics controller continues in state 6 until an inquiry 592 indicates that the transfer of data of the line tracker microprocessor 78 is complete.

Upon completion of the transfer of data through the output formatter electronics 198 is indicated to the control electronics by a signal on the line 200, the sequence of the control electronics 176 advances to state 7 at a step 594. Step 594 is also entered from the state 2A and from state 5. During state 7, address data is shifted between the segment storage registers 180, 182 and 184. All the address data for the top, bottom and line location for each potential line of one segment is shifted between the storage registers. For example, address data for a search segment in the storage register 180 is written into the storage register 182 and the preceding search segment address data, previously stored in the register 182, is written into the storage register 184. When the shifting of the address data between the registers is complete, an inquiry 596 advances the control electronics sequence to state 1.

When an end of data signal is received by the control electronics 176 when in state 1, the sequence advances to state 8. In this state the top, bottom and line position address data of the next search segment is output to the line tracker microprocessor 78 through the output formatter 198. The output formatter 198 is enabled by a signal during a step 598. The controller maintains the formatter 198 in the enable state until a complete signal is received on the line 200. This provides a positive response to the inquiry 600 and the state 8 advances to step 602. In step 602, the top, bottom and line position address data for the search segment in the storage register 182 is transferred into the storage register 184. Upon completion of the shift of data during the step 602 the inquiry 604 advances to sequence state 9. At the completion of state 8, only the storage register 184 contains top, bottom and line address data of a search segment.

In state 9 the step 606 enables the output formatter 198 to transfer the top, bottom and line address data of the last search segment compiled from data on the document 10 to the line tracker microprocessor 78. Upon completion of the step 606, as indicated by a positive response to the inquiry 608, the control electronics 176 returns to state 0. The segment linker 76 now awaits the routing of additional search segment data for the next document from the top/bottom detector 74.

Figure 10:
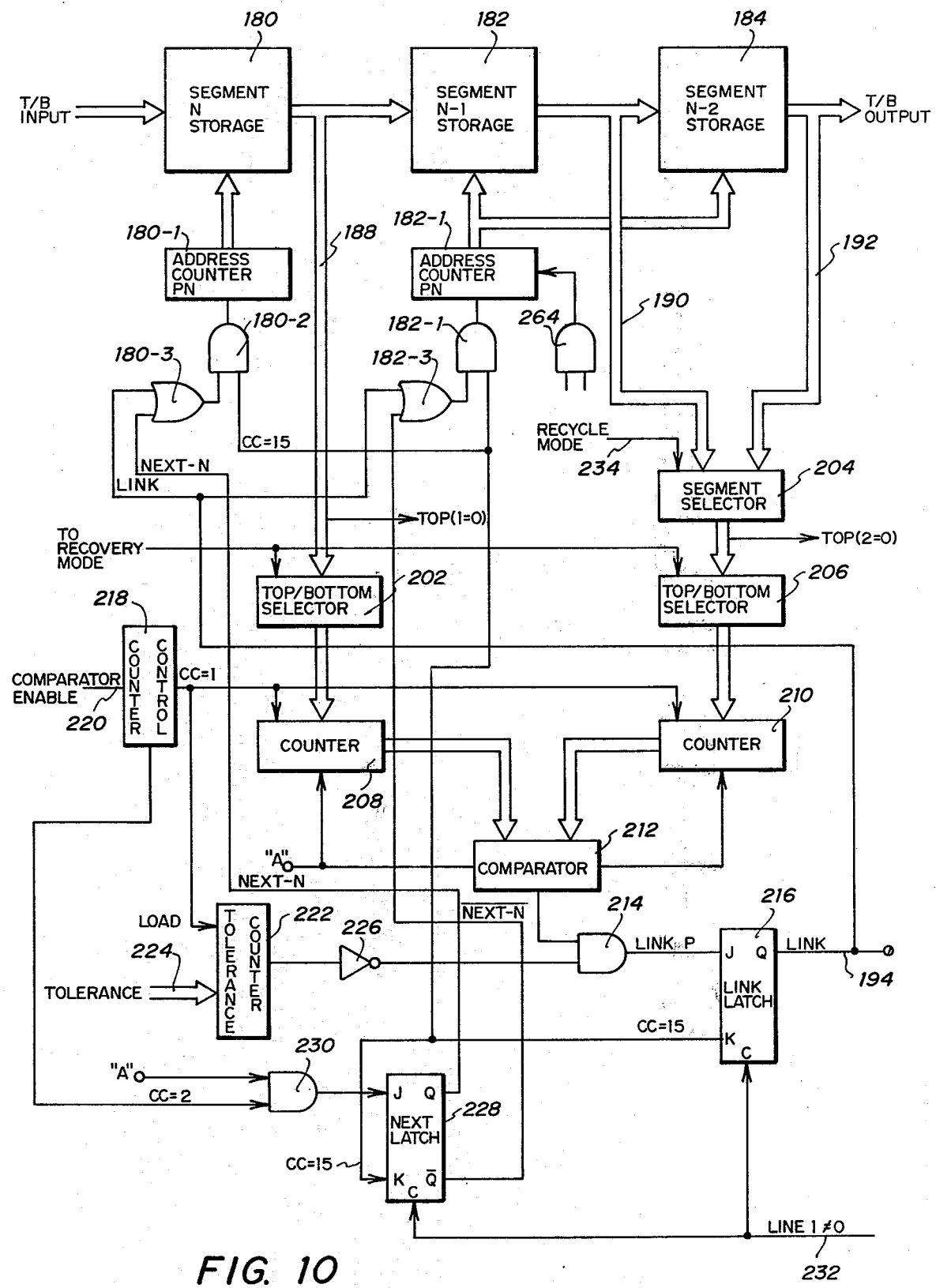
FIG. 10 is a logic schematic of the top/bottom comparator electronics of FIG. 8.

Referring to FIG. 10, there is shown a detailed logic schematic of the comparator electronics 186 including the storage registers 180, 182 and 184. As mentioned previously, the storage register 180 includes an address counter 180-1 driven by the output of an AND gate 180-2 coupled to an OR gate 180-3. The storage registers 182 and 184 are driven by an address counter 182-1 that is incremented by the output of an AND gate 182-2 having one input connected to an OR gate 182-3.

The comparator electronics receives the top/bottom address data from the register 180 at a top/bottom selector gate 202 and the top/bottom address data from the registers 182 and 184 at a segment selector gate 204. Segment address data selected by the gate 204 is routed to a top/bottom selector gate 206 at the same level as the selector gate 202. Selected address data from the gate 202 is coupled to a counter 208 and data selected by the selector gate 206 is gated to a counter 210. Output data from the counters 208 and 210 are input to a comparator 212.

Three output signals are generated by the comparator 212, one (210 > 208) connected to the counter 208, a second (208 > 210) to the counter 210 and a third (210 = 208) to one input of an AND gate 214. An output of the AND gate 214 connects to a flip-flop latch 216.

Address data is loaded into the counters 208 and 210 in response to the comparator enable signal to a control counter 218 received on the line 220 from the control electronics 176 during states 3, 4 and 5. A load signal from the control counter 218 is also applied to a tolerance counter 222 receiving tolerance data on a channel 224. The output of the tolerance counter 222 is coupled by an inverter 226 to a second input of the AND gate 214 coupled to the latch 216.

Also included as part of the comparator electronics is a flip-flop latch 228 for generating data signals to the OR gates 180-3 and 182-3. The flip-flop 288 is driven by the output of an AND gate 230. Reset signals for both the flip-flops 226 and 228 are provided over a line 232 from the line assignment electronics 196.

Initially, upon receiving the address data for the first search segment compiled from line data on the document 10, the control electronics 176 generates a signal to clear the storage registers 180, 182 and 184. The comparator enable signal on the line 220 is also generated to the control counter 218 with additional signals generated by the electronics 176 including a recycle mode signal on a line 234 during state 4 to the selector gate 204 and a top recovery mode signal on a line 236 during state 5 to the selector gates 202 and 204.

Enabling the control counter 218 resets this counter to zero and then enables the count to increase at a clock rate. Typically, the counter 218 is a 0-15 rollover counter that is used to sequence the comparator electronics 186. This counter generates three signals; count 1 (cc=1) which loads the comparator 212 with top or bottom address data from the storage registers 180 and the counters 208 and 210 (182 or 184) through the counters 208 and 210 as selected by selector gates 202, 204 and 206, count 2 (cc=2) which is applied to the AND gate 230 to control the selection of the next top/bottom address data pair to be compared by generating at the output of the flip-flop 228 the signal's next-N or next-N̄. The signal next-N is applied to the OR gate 180-3 and the signal next-N̄ is applied to the OR gate 182-3. The third signal generated by the control counter 218 is a count 15 (cc=15) signal used to control the address counters 180-1 and 182-1 by a connection to the respective AND gates 180-2 and 182-2. Also, the count 15 signal is applied to the flip-flop latch 216.

At count zero of the control counter 218 the counter registers 180-1 and 182-1 access a particular top/bottom address data pair of the last routed search segment (N) in the storage register 180 and a preceding search segment (N-1) or (N-2) in the storage registers 182 or 184. The selected top/bottom address data pair is gated through the selector gates 202, 204 and 206 for availability at the inputs of the comparator 212 through the counters 208 and 210. At count 1 (cc=1) the counters 208 and 210 are loaded with address data from the selector gates 202 and 206 and further the tolerance counter 222 typically a set of binary switches is loaded with a tolerance level over the channel 224.

The tolerance counter 222, after being loaded, counts down from the preset value to zero at the clock rate of the counter 218. The tolerance counter generates a link enable signal at the output of the inverter 226 as applied to one input of the AND gate 214. The link enable signal creates a time frame starting at the generation of the control count 1 and terminating when the tolerance counter 222 counts to zero from the tolerance level.

In operation of the comparator 212, one of three signals are generated during the comparison of each top or bottom address data pair from two search segments. The three signals are:

1. counter 210 is at a higher count level than counter 208;
2. counter 208 is at a count level greater than counter 210; and
3. the count level of counters 208 and 210 is equal.

The two greater than signals are used to increment the counter with the lowest count level at each clock pulse from the control counter 218. Thus, if the count level of counter 210 is greater than the level of counter 208, the comparator 212 generates a signal to increment the counter 208. If the count level of the counter 208 is greater than the level of the counter 210, then the comparator 212 generates signal to increment the counter 210.

When the count level of each of the counters 208 and 210 is equal, the third signal is generated which is applied to one input of the AND gate 214 having the second input from the tolerance counter 222 through the inverter 226. The output of the AND gate 214 steps the flip-flop latch 216 during the time frame established by the counter 222 to generate a "link segment" signal on the line 194 applied to the line assignment electronics 196 and the OR gates 180-3 and 182-3 indicating that a line link is present between cell data of one search segment and the corresponding cell data from a previous search segment. The link signal to the OR gates 180-3 and 182-3 increments the counters 180-1 and 182-1 to select the next top or bottom address data for line kinking evaluation.

When the comparator 212 produces other than the counter equal signal (3), indicating a segment link does not exist, during the tolerance counter time frame, the next top or bottom address data pair to be transferred to the comparator 212 is selected by the generation of an incrementing signal A to the AND gate 230 with the selection of the next top or bottom address data pair controlled by the address counters 180-1 and 182-1.

The counters 180-1 and 182-1 are individually incremented depending on the status of the previous comparison. The counter 180-1 is incremented upon the generation of the count 15 (cc=15) signal from the control counter 218 applied to the gate 180-2 if the link segment signal has been generated by the latch 216 or the next-N signal from the latch 228. As previously discussed, the link segment signal is generated when the comparator 212 detects a comparison between the counters 208 and 210 and the two top/bottom address data pair in the respective counters are within a linking tolerance as determined by the countdown of the tolerance counter 222.

The next-N signal is generated at the output of the flip-flop latch 228 when the top or bottom location of a search segment in either the storage registers 182 or 184 is above the top or bottom location of the next recent search segment (N) routed into the storage register 180. The next-N signal is also generated if the most recent search segment (N) routed to the storage register 180 has already been assigned a line number which is indicated by the line 1 ≠ 0 signal generated on a line 232 from the line assignment electronics 196.

To increment the address counter 182-1, the control counter 218 must generate the count 15 (cc=15) signal and either the link segment or the $\overline{\text{next-N}}$ signal must be generated to the OR gate 182-3. The link segment signal is generated in the manner described and the $\overline{\text{next-N}}$ signal is generated at the output of the flip-flop latch 228. This signal is generated at the occurrence of the count 15 signal and when the comparator 212 does not generate an incrementing signal A to the AND gate 230 at the time control count 2 (cc=2) is generated.

In operation of the comparator electronics 186, the control electronics 176 operates as previously described to load into the segment register 180 top and bottom data for each of the potential lines identifiable on the document 10. The top and bottom data for any one line is loaded into one address location and for each potential line the data is loaded into a separate word address. Initially, the line assignment number of each word of the storage register 180 is zero to indicate that the word has not as yet been assigned to a line number, although the line number may have been previously identified and stored in the storage registers 182 and 184. After completion of states 2 and 2A, all the top and bottom data for potential lines is stored in the register 180 with the last word containing all zeros to indicate the end of a search segment. The control electronics 176 then advances to state 3.

As explained, in state 3 the address counters 180-1 (AD1) and 182-1 (AD2) are reset to a zero address and the recycle and top mode signals are at a zero level with an enable signal applied on the line 220 to the control counter 218. During the operation of the control electronics in state 3, the top and bottom line data of one word from the storage register 180 is applied to the top/bottom selector 202 and the top and bottom data of one word in the storage registers 182 and 184 is applied to the segment selector 204. With the recycle mode signal on the line 234 at a zero level, the selector 204 passes the top and bottom data from the storage register 182 to the top/bottom selector 206.

When in state 3, the top recovery mode signal is at a zero level and the selectors 202 and 206 will pass only the bottom data to the respective counters 208 and 210. This bottom data is applied to the comparator 212 that generates incrementing signals to the counter with the lowest bottom location. The counter with the lowest bottom location is continually incremented and the data compared in the comparator 212. If a comparison is made within the tolerance time frame as established by the tolerance counter 222, then the latch 216 generates a linking signal on the line 194 indicating that the bottom data from the storage registers 180 and 182 as compared in the comparator 212 is from a potential identifiable line.

The linking signal on the line 194 is applied to the OR gates 180-3 and 182-3 for setting the AND gates 180-2 and 182-2, respectively. At the next occurrence of the count 15 (cc=15) signal, the AND gates 180-2 and 182-2 provide an incrementing signal to the address counters 180-1 and 182-1, respectively. This increments the address to the next word address position of the storage registers 180, 182 and 184.

State 3 continues to recirculate with the bottom data for each address in the storage registers 180 and 182 compared in the comparator 212. So long as the comparison is achieved within the tolerance time frame, a linking signal is generated.

If the comparison does not occur within the time frame of the tolerance counter, then the enabling signal to the AND gate 214 disconnects the output of the comparator 212 from the latch 216. At the next occurrence of the count 15 signal, the latch 228 is set to either the next-N signal or the $\overline{\text{next-N}}$ signal as determined by the output of the AND gate 230. A signal is generated at the output of the AND gate 230 during the count 2 (cc=2) signal when the output of the comparator 212 indicates the bottom data in the counter 208 is lower on the document 10 than the bottom data in the counter 210. When this occurs outside the tolerance time frame, the indication is that the bottom data in the storage register 180 is not a link with the bottom data compared from the storage register 182. The next-N signal is generated at the output of the latch 228 and applied through the OR gate 180-3 to the AND gate 180-2 to increment the address counter 180-1. At this time, the address counter 182-1 is not incremented and the next comparison will be of the bottom data at different address locations in the storage registers 180 and 182.

If at the end of the tolerance time frame the location of the bottom address in the counter 210 is lower than the bottom address in the counter 208, then the latch 228 generates the next-N signal to increment the address counter 182-1 for the next comparison of bottom data.

After all of the bottom address data in the registers 180 and 182 have been compared and linked, where possible, the control electronics 176 advances to state 4 where the address counters 180-1 and 182-1 are again reset to zero. The top recovery mode signal is also again set to zero and the control counter 218 enabled by a signal on the line 220. The recycle mode signal on the line 234 is now at an enable level, and during the recycle mode, the bottom data from the storage register 184 will be selected through the selector gate 204 to the top/bottom selector 206.

State 4 of the control electronics 176 is a repeat of state 3 with the exception that the bottom address data of the storage register 180 is compared with the bottom address data from the storage register 184. Again, each potential line bottom is compared to establish either a linking condition or a nonlinking condition.

At the completion of state 4, the sequence of the control electronics 176 advances to state 5 which is the top recovery mode operation. State 5, as previously discussed, may also be entered from state 3 if the search segment in the storage register 180 is the first lifted from the document 10. For this condition, there would be no data in the storage register 184 for comparison in the recycle mode and state 4 would be bypassed.

When in state 5, the address counters 180-1 and 182-1 are again reset to zero. The recycle mode signal to the selector gate 204 is zero, the top recovery mode signal to the selector gates 204 and 206 enables these two gates, and the control counter 218 is enabled by a signal on the line 220. In the top recovery mode, top address data from the segment storage 180 and the segment storage 182 is transferred through the selector gates 202 and 206, respectively, to the counters 208 and 210. During operation of the control electronics in state 5, the top address of potential lines in each word in the storage registers 180 and 182 is compared for a linking condition. Again, the linking condition is determined by the tolerance couter 222. The same comparison of top data is completed as described previously with regard to the comparison of bottom data to generate linking signals, where a link exists, on the line 194.

Operation of the comparator electronics 186 continues until there is detected top address data that equals zero. This condition occurs when the data from the storage register 180 indicates a top address of zero (signal top 1 = 0 on line 238) or the data from the selector gate 204 produces a signal (top 2 = 0) to the control electronics 176 on a line 238. With the detection of the top = 0 address location, the control electronics 176 turns off the enable signal on the line 220 to the comparator electronics 186.

Figure 11:
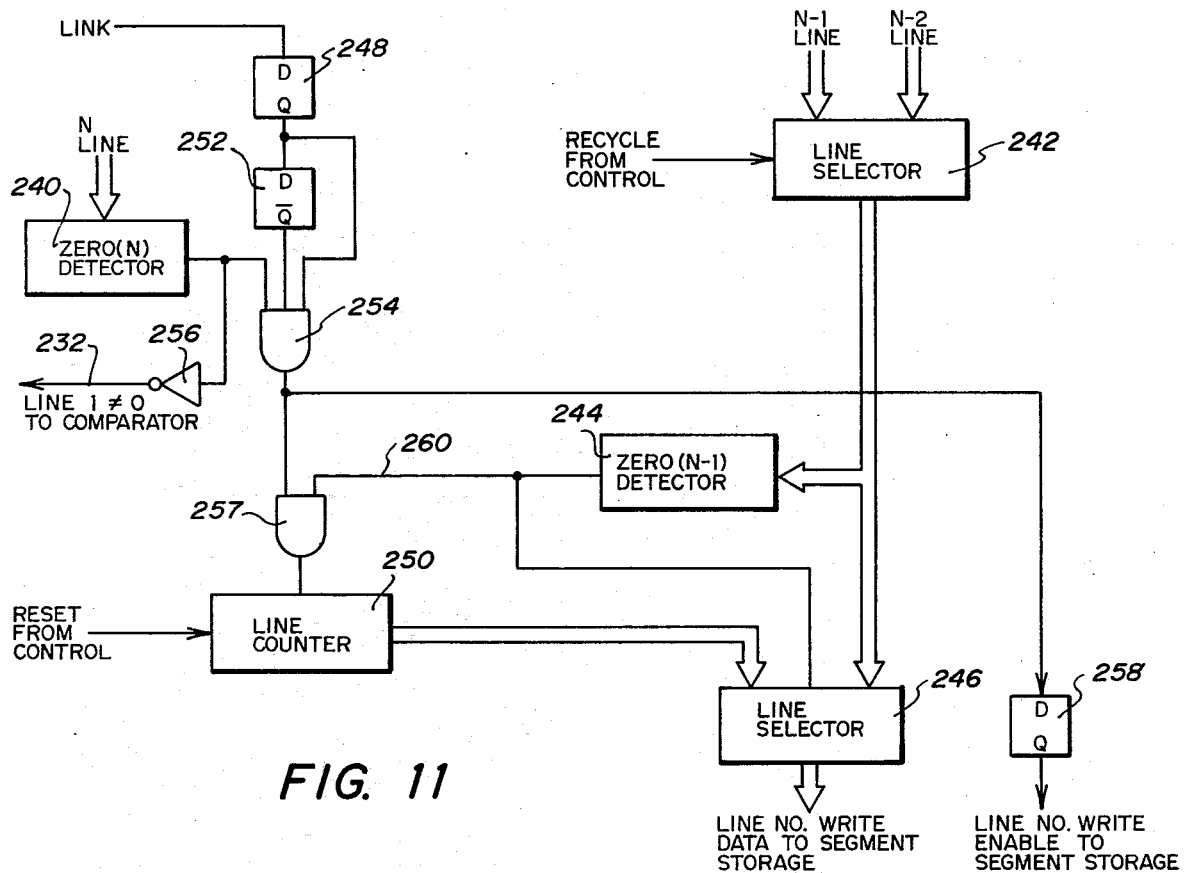
FIG. 11 is a logic schematic of the line assignment electronics of FIG. 8.

Referring to FIG. 11, there is shown a logic schematic of a line assignment electronics 196. Top/bottom address data of search segments from the storage register 180 is applied to a "zero" detector 240 and top/bottom address data from the registers 182 and 184 are applied to a line selector gate 242 having output data routed to a "zero" detector 244 and a line selector gate 246. The "zero" detectors 240 and 244 comprise logic circuitry that responds to a zero line member in an address of the storage registers.

Additional inputs to the line assignment electronics are the link segment signal from the latch 216 of the comparator electronics 186 applied to a delay line 248, a reset signal from the control electronics 176 applied to a line counter 250, and a recycle signal, also from the control electronics 176, applied to the selector gate 242. The link segment signal delayed by the delay line 248 is applied to a delay line 252 and also coupled to one input of an AND gate 254. A second input to the AND gate 254 is the output of the delay line 252 and a third input is from the "zero" detector 240. The output of the "zero" detector 240 is also coupled through an inverter amplifier 256 as a line not equal zero signal (line 1 ≠ 0) applied to the comparator 186 on the line 232.

An output from the AND gate 254 is applied to an AND gate 257 having an output to the line counter 250 and a second input coupled to the output of the "zero" detector 244. The output of the AND gate 254 is also applied to a delay line 258.

Additional inputs to the line selector 246 are address data from the line counter 250 and a select counter signal from the "zero" detector 244. The line selector gate 246 generates one of the outputs of the line assignment electronics. This output is the line number write data applied to storage registers 180, 182 and 184. A second output from the line assignment electronics is generated at the delay line 258 and is the line number write enable signal for the segment storage registers 180, 182 and 184.

The line assignment electronics 196 is enabled by the link segment signal from the comparator 186 during states 3, 4 and 5 of the control electronics 176 which is expanded into a single clock pulse by action of the delay lines 248 and 252. The delayed signals from the delay lines 248 and 252 are ANDed with the output of the detector 240. If the currently addressed top/bottom address data from the storage register 180 has not already been linked to a character line, the detector 240 receives a zero word from a current address of the register 180 and produces a line zero signal to the AND gate 254 for further operation of the line assignment electronics. If the currently addressed top/bottom data has been linked to a pattern line, then the detector 240 receives data of an assigned line number and does not generate the zero line signal and the line assignment electronics is inhibited from further operation. By operation of the inverter 256, the output of the detector 240 is applied to the flip-flop 216 and 228 over the line 232 to the comparator 186.

The recycle signal from the control electronics 176 during states 3 4 and 5 to the line selector 242 selects the address of the current line number of the previous search segment (N-1) from the storage register 182 or the second previous search segment (N-2) from the storage register 184. The selected line number at the output of the selector gate 242 is applied to the "zero" detector 244 and the line selector gate 246. If the selected line number from the gate 242 is other than zero, as indicated by the output of the "zero" detector 244 on the line 260, the selector gate 246 passes the line number address from the selector gate 242 as the line number write data to the segment storage register 180. If the line number address selected by the gate 244 is zero, as indicated on the line 260, then the AND gate 257 produces an increment signal to the line counter 250. The line counter 250 is incremented and the line selector gate 246 selects the new count from the line counter as the line number write data to the segment storage registers 180, 182 and 184.

one clock pulse later, as generated at the output of the AND gate 254, the delay line 258 provides a line number write enable signal and the assigned line number from the selector gate 246 is written into the segment storage registers 180, 182 or 184, depending on the recycle signal to the selector gate 242. At the completion of the generation of line numbers for each document, a reset signal from the control electronics 176 resets the line counter 250 to zero.

Figure 12:
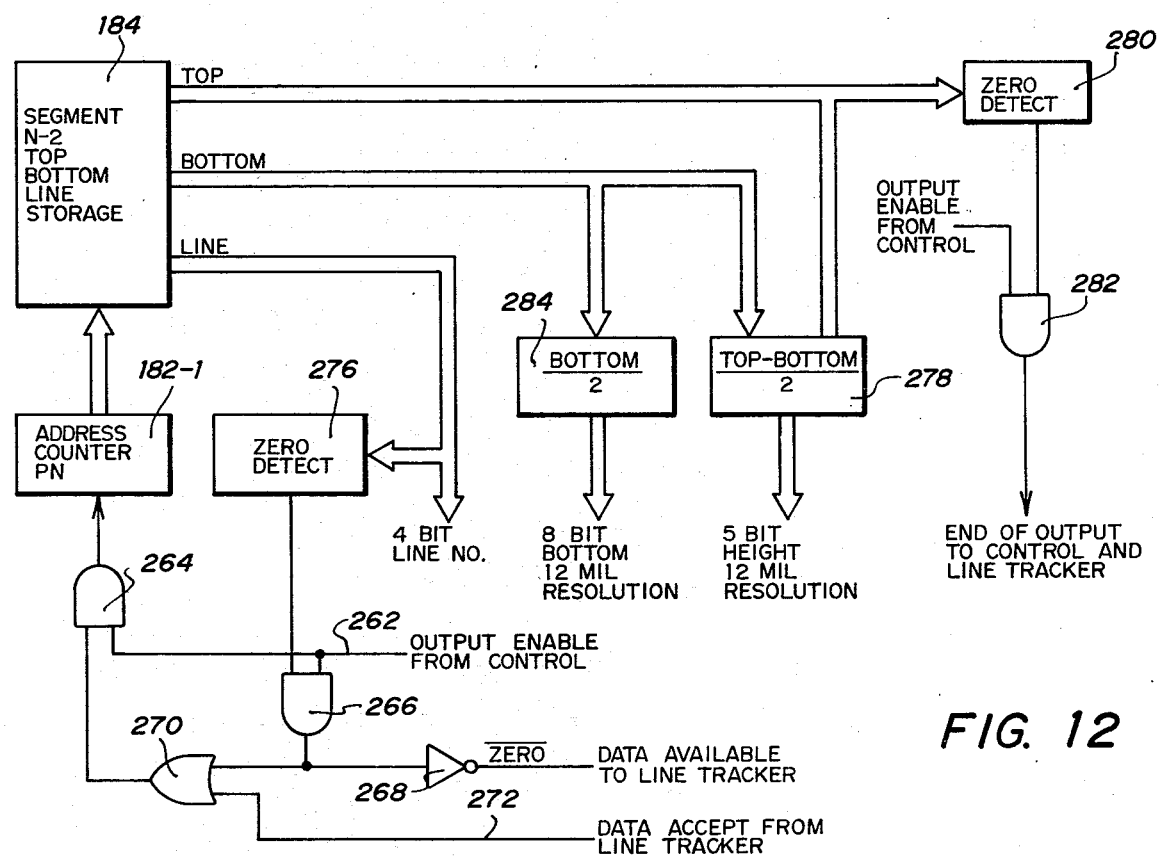
FIG. 12 is a logic schematic of the output formatter electronics of FIG. 8.

Referring to FIG. 12, output data from the segment linker 76 is generated at the output formatter 198 that receives from the storage register 184 top/bottom address data and a four bit line number. The output formatter 198 is enabled from the control electronics 176 during states 6 and 8 and 9 on a line 262 coupled to AND gates 264 and 266. An output from the AND gate 266 is coupled through an inverter 268 to the line tracker 78 and also applied to one input of an OR gate 270. A second input to the OR gate 27 is a data accept signal from the line tracker 78 on the line 272. An output of the OR gate 270 is connected to a second input of the AND gate 264 that provides an increment signal to an address counter 182-1 to the segment storage register 184.

Line number address data from the segment storage register 184 is applied to a zero" detector 276 having an output to the AND gate 266. The line number address data is also routed to the line tracker 78. The top of line address data from the storage register 184 is applied to a divider 278 and also to a "zero" detector 280. An output from the "zero" detector 280 is applied to an AND gate 282 also receiving an enable signal from the control electronics 176. An output of the AND gate 282 is a control signal to the line tracker 78.

Also coupled to the divider 278 is the bottom of line address data from the storage register 184. This data is the address of the bottom of an indentifiable line and is also applied to a divider 284. Both the dividers 278 and 284 may be implemented by logic circuitry that discards one bit of the input word in accordance with standard logic operation. By means of the dividers 278 and 284, each top/bottom line element in the segment storage register 184 is reformatted into a bottom/height/line address element. The line bottom data, as applied to the divider 284, is reformatted from a nine bit number into an eight bit number for routing to the line tracker 78. The line height data is calculated in the subtractor/divider 278 by subtracting the line bottom address data from the line top address data and dividing the total by two. This information is also applied to the line tracker 78.

Figure 13:
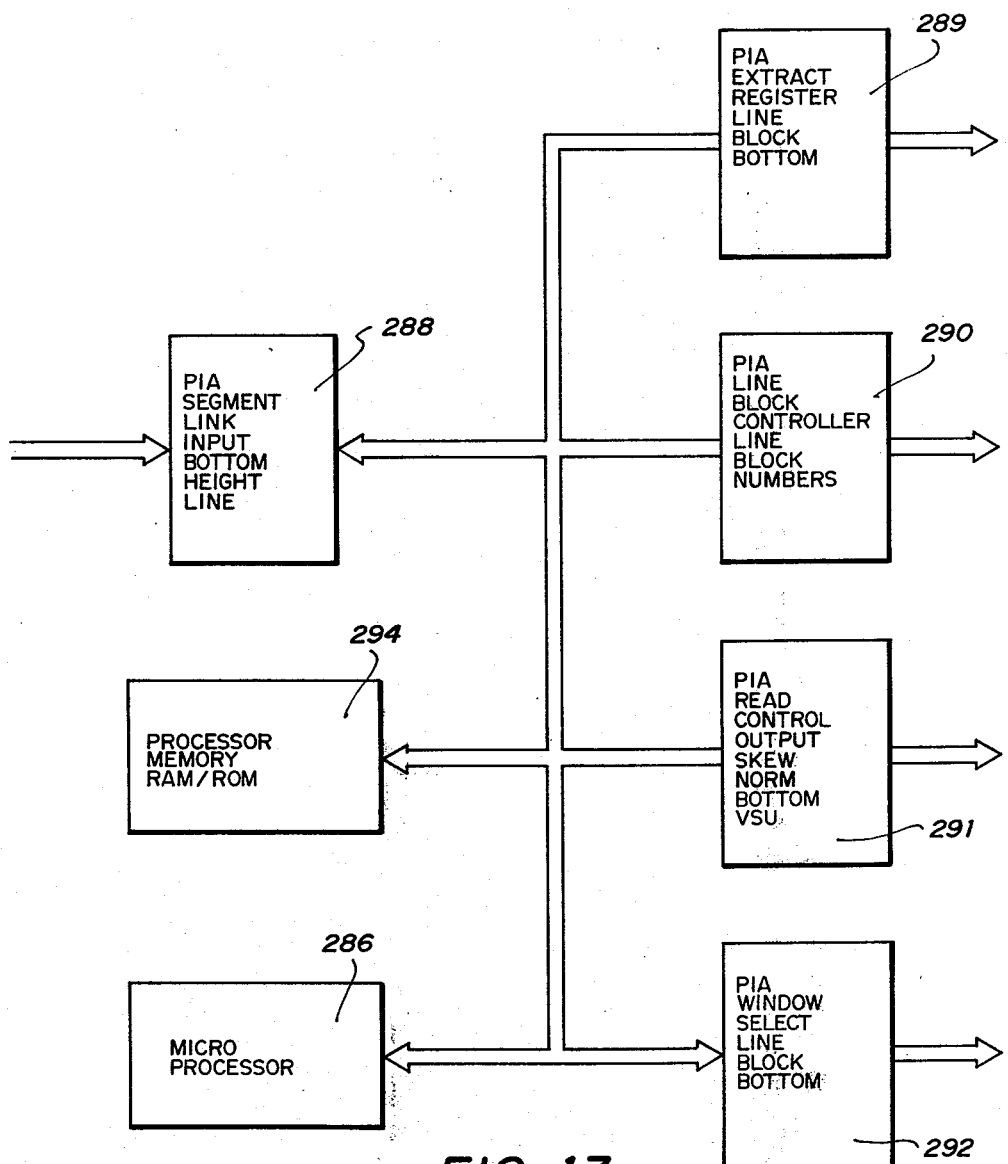
FIG. 13 is a block diagram of the line tracker microprocessor of the search electronics of FIG. 2.

Referring to FIG. 13, there is shown a block diagram of the line tracker microprocessor 78 including a microprocessor 286 that typically may be manufactured by Motorola Inc. and identified as a Motorola 6800 Microprocessor. The microprocessor 286 is coupled to peripheral interface adapters (PIA) 288–292 each providing interface electronics for inputing or outputing data to or from the microprocessor 286. Also included as part of the line tracker 78 is a processor memory 294 including random access memory capability and read only memory capability. The individual blocks illustrated in FIG. 13 refer to the Motorola 6800 Microprocessor and peripheral interface adapters. The processor memory 294 is configured with a 1K random-access memory for data storage and a 2K read-only memory for program storage.

Input data including bottom/height address data bits from the segment linker 76 with associated interrupt signals, data available signals, end of search signals, and end of envelope data signals are coupled to the mciroprocessor 286 through the peripheral interface adapter 288. The peripheral interface adapter 289 couples line block bottom address data to the extraction registers 52, along with associated interrupt signals utilized by the extraction registers to transfer the next block of video bottom data for a line on the document 10 from the strip memory 48. The peripheral interface adapter 290 couples line block address numbers from the memory 294 to the line block memory controller 50. The peripheral interface adapter 291 outputs parameter data relating to line skew, normalization factors, a read window bottom data and a video storage unit (VSU) number to the normalizer 60. The peripheral interface adapter 292 provides address data relating to line block bottoms to the read window select formatter 54.

In operation of the line tracker microprocessor 78, input data is controlled by interrupts from the segment linker 76, including a data available interrupt generated on line 174 that enables segment address data from the output formatter 198 to be read through the peripheral interface adapter 288 for storage in the processor memory 294 in a current segment data area. There are up to five data interrupts for each search segment (one for each identifiable line) including an end of segment interrupt generated on line 172 that indicates that all of the address data for the current search segment has been input and stored in the processor memory 294. Another interrupt for controlling the input of search segment data from the segment linker 76 includes an end of envelope interrupt that indicates that all of the line address data for the document 10 has been input into the processor memory 294.

Output data from the microprocessor 78 is controlled by two interrupts from the line block memory controller 50. The first interrupt is generated when the line block memory controller 50 is conditioned to receive a new line block assignment from the write data controller. Upon the occurrence of this interrupt, the line tracker microprocessor 78 provides output address data related to new video data block assignments in the line block memory 50 and new line block bottom parameters to the extraction register 52. The second interrupt controlling the output of the line tracker microprocessor 78 is generated when the line block memory controller 50 is ready to route line block video data to the read window select formatter 54. At this interrupt, the line tracker mciroprocessor 78 provides outputs of line block assignments to the line block memory controller 52 and new line block bottom data to the read window select formatter 54.

In response to an input interrupt, address data in word format relating to the patterns appearing on the document 10 are stored in the random access memory of the processor memory 294 including the bottom, height, and line address data input from the segment linker 76. Particularly, the data words are arranged in five sets of three words each, with each three work set containing one bottom, height and line segment address from the segment linker 76. Two additional data words are stored in the random access memory indicating; first, the next storage element of the block memory 50 available for input data, and second, to indicate the next data available for processing by the microprocessor 286. The last data word in the random access memory is the end of data signal which indicates that all of the address data for a particular search segment has been input to the processor memory 294.

Initially, the random access memory is void of any search segment data and two pointers (X) and (XL) contain the address of the first bottom storage element available. Also, the end of data signal (EOD) is reset to zero and the microprocessor 286 is executing a scheduler routine as shown in FIG. 14. The microprocessor 286 continues to execute the scheduler routine until a segment data interrupt occurs at which time the bottom, height and line address data for each line of a search segment is input to the memory 294 from the segment linker 76. The address data relating to the bottom of a line pattern is stored in the memory location having the address contained in the first pointer (X). The address data relating to the line height is stored in a memory location after storage of the address data relating to the line bottom. The address data relating to the line number is stored in the next memory location following the storage of the data height. The first pointer (X) is then updated to an address for the next available storage element to receive the next line pattern bottom, height and line address data. The microprocessor is returned to the scheduler loop of FIG. 14 at the point of interruption when all available line data is input from the segment linker 76.

As the microprocessor 286 steps through the scheduler routine of FIG. 14, it advances to the inquiry 296 and since the first pointer (X) does not equal the second pointer (XL) after data has been input to the microprocessor the operation of the microprocessor 286 steps to the subroutine 298. The microprocessor 286 executes the subroutine 298 which is a line tracking process on the most recent bottom, height and line address data from the segment linker 76. During the line track subroutine, the second pointer (XL) is updated to contain an address above the previously processed line, and upon completion of the line tracking subroutine, the microprocessor 286 returns to the scheduler loop at the inquiry 296.

Referring to FIG. 15, there is shown a flow chart of the line tracking subroutine 298 that includes operation of the microprocessor 286 in conjuction with the processor memory 294 to control the collection of video data in the line block memory 50 and to make the necessary intermediate line parameter calculations. The storage areas of the processor memory 294 are the line top, height and line address calculation tables, the line block memory element allocation table and the line block memory element assignment table.

This subroutine is called when the scheduler routine of FIG. 14 responds to a "no" input to the inquiry 296 (pointer X is not equal to pointer (XL). The routine of FIG. 15 makes entries to the processor memory 294 for each data word of a search segment in the line assignment and calculation tables of the memory 294.

In operation of the line track subroutine of FIG. 15, the address of a line calculation table is derived from the immediately occurring line number. There are a fixed number of line calculation tables, one for each possible line number assignable by the segment linker 76, and each line calculation table contains the parameters for one line of characters. Such parameters include the X-coordinate of the beginning of a line assignment and the X-coordinate of the ending of a line assignment.

Initially, after starting the subroutine 298 at the step 303, where the address of the line calculation table is derived from the input data line number (XL+2), the address of a line element is tested in an inquiry 304 to determine if the data is the first element of a pattern line. Each line calculation table contains the parameters for a line including (X-START)——the X-coordinate of a line beginning, and (X-STOP)—— the X-coordinate of a line end. Where the address data is the first for a possible line, the microprocessor 286 tries to identify the data with the search segment which immediately proceeds the search segment under investigation. This information from the previous segment that proceeds the data for a possible line must be collected in the line block memory 50, as will be explained.

When a new line of data is identified (X-START[L] = 0), the inquiry 304 advances the line track subroutine to the step 306 where the X-coordinate is decremented and through the step 308 where the current coordinate (XC) is now equal to (XC-1) to the allocate subroutine 310. The allocate subroutine operates to allocate address data for storage elements of the line block memory 50 for an anticipated line start block of video data in the processor memory 294. Upon completion of the allocate subroutine 310, the line track processing proceeds to the step 312 where the current X-coordinate is incremented to XC = XC+1 and then to an allocate line block memory subroutine 314. The line block allocate subroutine 314 then collects address data of storage elements of the line block memory 50 for storing in the processor memory 294 and all lines of the current search segment.

When a line of the current search segment is not a line start (X-START $\neq$ 0), then the inquiry 304 advances the subroutine of FIG. 15 to the inquiry 316 where a test is made (X-START = XC - 2) to determine if gaps occur between character patterns of a line, such as between the video data blocks 86 and 89. Gaps will occur in a line as a result of recycle mode linking by the segment linker 76. When a gap does occur in a line of video data, such a gap must be collected in the line block memory 50. This is provided for by decrementing the current X-coordinate of the address of a storage element in the step 308 (XC = XC - 1) and calling the line block allocate subroutine 310, as explained previously. Again, the subroutine of FIG. 15 proceeds to the step 312 and to the allocate line block memory subroutine 314.

When a video data block of a line in a current search segment is neither a line start (X-START $\neq$ 0) nor indicates a gap in a line of data(X-START = XC - 2), then the line address data is checked for multiple data cells in the same search segment. Multiple data cells is a problem that occurs when the segment linker 76 links two cells of one search segment to one cell of the previous search segment. The multicell problem is searched by a negative response to the inquiry 316 advancing the subroutine to the inquiry 318. If multicells occur in a search segment, only the lowest cell of the search segment is allocated to the line block memory 50. Multicells are detected when the current X-coordinate of the address of a storage element is equal to the coordinate of the end of the line (X-STOP = XC).

For data cells in a search segment that are not starts, gaps in pattern lines, or multiple cells, the line block allocate memory subroutine 314 runs to collect address data for the current data cells of the search segment. The last function of the line track subroutine of FIG. 15 is to update intermediate line parameter calculations which are used by the line selection processor to compute line skew, normalization and window bottom parameters. This updating is completed by the subroutine of FIG. 15 proceeding through the step 320 where X-STOP is made equal to XC from the subroutine 314 to the update partial sums subroutine 322 where the actual data updating takes place. After the subroutine 322, the subroutine of FIG. 15 is completed by the microprocessor 286 by exercising the step 324.

The line block memory allocater subroutines 310 and 315 assign line block storage elments (storage areas in the line block memory 50) to three data cells of the search segment. The subroutine involved uses a current X-coordinate to select a nine word block of the line block memory assignment storage of the processor memory 294. The nine word block contains three word sets with each set consisting of a bottom word, a line number word, and a storage element number word. The line block allocater subroutines scan the word sets for an empty line block element of the memory 50 which is indicated by a null line code. When an empty line block storage element is found, the next available line block storage element is removed from the line block availability list and stored in the line block number of the slot. Next, the current bottom data and line number data are stored in the selected block.

On occasion, all the available line storage elements of the memory 50 are assigned address data and in this situation a reassignment of the storage elements is made. If the address of the bottom data of the current search segment is lower than the address of the highest assigned bottom word, then that storage element is reassigned to the new line element. This reassignment is accomplished by storing the new bottom data and line number data over the previously stored data. An important timing consideration in the assignment of line block storage elements is that the line block memory assignment table must be stable before the line block memory controller 50 generates the interrupt to request extraction parameters.

After all the line pattern data from the segment linker 76 has been stored in the processor memory 294, the end of segment interrupt occurs and the microprocessor 286 steps the scheduler routine to the inquiry 300. Note, that the scheduler routine continues to circulate until all the data from the segment linker 76 is line tracked before the end of a data interrupt occurs at which time the microprocessor 286 steps to the subroutine 302. This subroutine allows the first and second pointers to be reset to the address of the bottom 1. At this time, the end of data signal (EOD) is also reset to "zero", all during the completion of the end of segment subroutine 302.

An important feature of the operation of the microprocessor 286 during the input of data to the processor memory 294 is that the incoming data is input during an interrupt routine but processed in background. This permits the microprocessor 286 to immediately respond to output interrupts. That is, when additional data is processed to the read electronics 58, the microprocessor is immediately available. A timing consideration of the operation of the microprocessor 286 is that the line tracking calculations and end of segment process for a search segment must be completed before the occurrence of the first segment data interrupt for the next search segment.

At the end of each calculation and the running of the subroutine of FIG. 15, the microprocessor 286 resumes the scheduler routine to the inquiry 300. A positive response to the inquiry 300 (indicating the end of a data set) advances the mciroprocessor 286 to the subroutine 302. The end of segment subroutine 302 is run at the end of calculations for each search segment. This subroutine resets the first and second pointers and the end of data signal. The current X-coordinate of an available storage element of the memory 50 is also incremented in preparation for the next search segment and each of the line calculation tables is checked for line ends. A line end is found any time the X-coordinate at the beginning of the line is not equal to zero and the current X-coordinate (XC) is equal to the X-coordinate of the lines X-STOP + c. For each line end found, the line block allocater subroutine of FIG. 15 is called to collect the last segment of data.

To route video data from the strip memory 48 to the line block memory 50, the microprocessor 286 executes an extraction output subroutine to output new parameters to the extraction registers and the line block memory controller 50. Initially, the line block memory allocation table of the memory 294 is reset to accept line assignments as the line track subroutine 298 is run. Assignments to the line block memory allocation table are made by the line block memory allocate subroutines 310 and 314. An output activate word contains the address of the next parameter area comprising the next nine words. Initially, the first one word of the line block memory allocation table is addressed for output to the extraction registers 52. This first word is reset at the end of the video data from the extraction registers 52. At each extraction output interrupt, the parameters of a line block of video data in the allocation table, as indentified by the output address, is output to the extraction registers and the line block memory controller 50. The output address is then updated to the same line block of video data in the next search segment. This routine continues until the all selected areas of video data in the strip memory 48 are transferred to block locations in the memory controller 50.

During running of the scheduler routine of FIG. 14 by the microprocessor 286, a negative response to the inquiry 300 (when additional data for a search segment is found) advances the loop to the inquiry 326 which upon a positive response calls a line selection subroutine 328. The line selection subroutine selects the address of the bottoms of two lines tracked from the document 10 and builds skew, normalization and window bottom parameters for the selected two lines.

The criteria for selecting the address of the bottom line is to find the stored data with the lowest average Y-coordinate that has at least four data blocks. Lines of patterns with three or less data blocks are rejected as indicating an incomplete line. The criteria for selecting the second line of patterns is that it must overlap the bottom line by at least two search segments in the X-coordinate direction and contain at least four data words. After the two lines have been selected, all of the line data blocks identified with other lines of patterns from the document 10 are released for reallocation on the next document.

After selecting the bottom two lines of patterns, the parameters of the characters are calculated including the normalization factor, skew factor and window bottom in accordance with the following calculations:

$$\text{Norm factor} = \frac{\text{sum}HT}{2 \text{ sum}P}$$

$$\text{Skew factor} = \frac{\text{sum}XY - \frac{(\text{sum}X)(\text{sum}Y)}{\text{sum}P}}{\text{sum}X^2 - \frac{(\text{sum}X)^2}{\text{sum}P}}$$

$$\text{Window Bottom} = \frac{\text{sum}Y}{\text{sum}P} - \text{skew}\frac{(\text{sum}X)}{\text{sum}P} - 2 \text{ norm}$$

Both the skew factor and window bottom parameters represent a least squares evaluation of the points derived from the center height representing the line. After the line parameters have been calculated, an output poiner (Y) is set to the first area of the line block memory assignment table of the memory processor 294 that contains data from the bottom selected line of patterns. The bottom line coordinates are then output to the read widnow and select formatter 54 and the present line number (L) and the last line assignment number (LL) are set to the line number of the selected line. Following, the next line assignment number (NL) is set to the line number of the selected second line and the line selection subroutine 328 is completed by the unloading of data from the line block memory 50 to the read electronics 58 which is initiated by outputing the first line block bottom address to the window select and formatter 54 and the line block number to the line block memory controller 50. The completion of the unloading of data from the line block memory 50 to the read electronics 58 is controlled by the window select instruction words.

Operation of transfer of input and output data to the microprocessor 78 continues, while processing is completed in background, until the line block memory controller 50 provides an interrupt to the processor when new coordinates of data are required by the read window select and formatter 54. At each interrupt by the controller 50, the output pointer (Y) is incremented for the next search segment (Y= Y+9) and the new parameters of the current line (L) are output through the formatter 54 to the read electronics 58. This transfer of data continues until the end of a line of pattern data is detected. The end of line of pattern data is detected when there are no more available address locations of the line block memory assignment table of the processor 294 addressed by the output pointer (Y). Upon the detection of an end of line, a stop code is output from line block memory controller 50 and the current line (L) is set to the next line (NL) of data to be transferred to the read electronics 58. The microprocessor resumes the scheduler routine and when an end of line code is detected (L ≠ LL) an inquiry 330 produces a negative response to advance the microprocessor to a "next line read" subroutine 332.

When the "next line read" subroutine is first called the initial step is to set the next line (NL) address to zero and the last address line (LL) to the second line number. Then the output pointer (Y) is reset to the beginning of the second line address and the second line normalization, skew and window bottom parameters are output to the read and select formatter 54 and the normalizer 60. Upon completion of this step, the unloaded data for the first section of the second line is output to the line block controller 50. Upon completion of the transfer of the second line of data, all the line blocks assigned to the read lines are reset and all output addresses are likewise reset in preparation for the transfer of additional input data to the processor memory 294.

Figure 16:
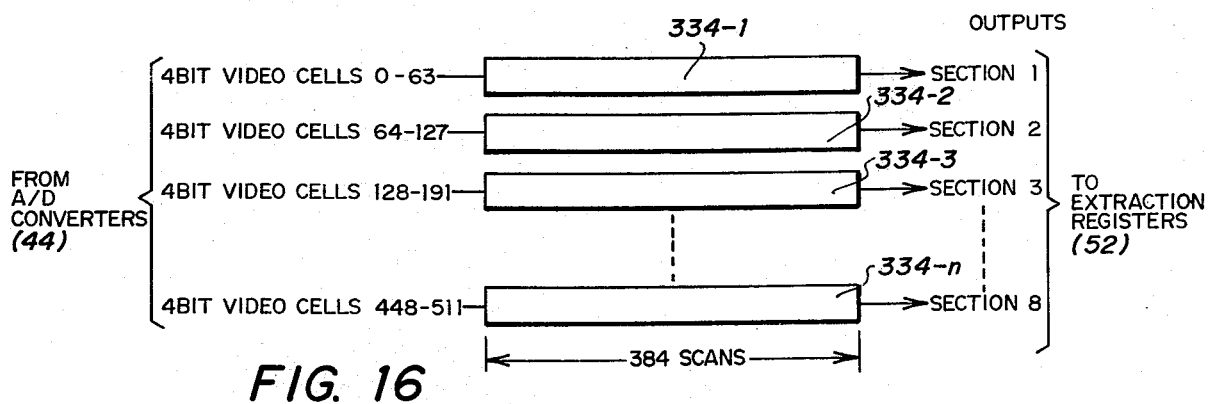
FIG. 16 is a logic schematic of the strip memory of the memory electronics of FIG. 2

Referring to FIG. 16, line selection processing is completed to extract stored data from the strip memory 48 for routing to the line block memory controller 50. The strip memory is a video buffer comprising shift registers 334-1 through 334-n, consisting of 8-sections in FIG. 16. As shown, the strip memory provides a delay of 384 scans of the array 30 during which time the search electronics 32 completes the process of line selection. Input data to each register is four bit video from the analog-to-digital converters 44 allowing the storing of gray values of each video data cell. The eight section strip memory of FIG. 16 provides storage for a 512 cell high acquisition zone.

Figure 17:
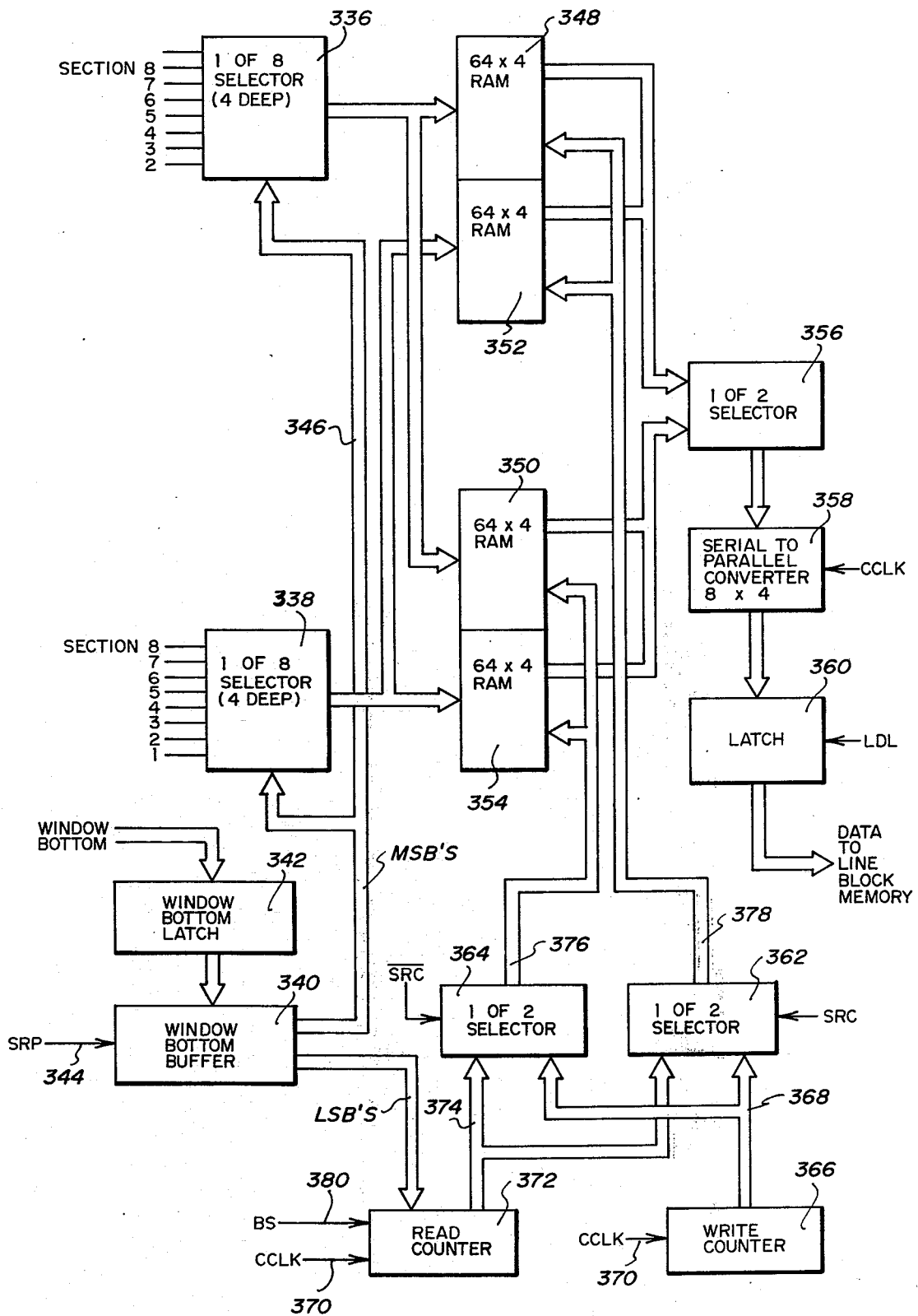
FIG. 17 is a logic schematic of the extraction registers of the memory electronics.

Referring to FIG. 17, there is shown a logic schematic of the extraction registers 52 which selects video data containing line information from the strip memory 48 and routes this data to portions of the line block memory controller 50. In the specific system described herein, three extraction registers are operated simultaneously so that three separate portions of the video can be written into respective allocated line block storage elements of the line block memory controller 50. FIG. 17 is a schematic of one of the three extraction registers 52. An output line from each of the registers 334-1 through 334-n is connected to an individual input line of selector gates 336 and 338. These selector gates are addressed by output data from a window bottom buffer 340 having an input from a window bottom latch 342.

Prior to the extraction operation for a block of video data from the strip memory 48, the location of the lowest cell of data for a particular data block is routed to the extraction logic comprising the latch 342 and the buffer 340. Information routed to the latch 342 is known as the "line block window bottom" and is stored into the latch by a signal generated by the line tracker microprocessor 78. When the search segment associated with a new window bottom appears at the output of the registers 334-1 through 334-n, the window bottom buffer 340 is loaded with data from the latch 342 by a signal SRP on a line 344 that is also routed to the line tracker microprocessor as interrupt signal. The signal on the line 344 identifies that the window bottom latch 342 is ready to be updated for the next search segment that will appear at the output of the registers 334-1 through 334-n.

The window bottom code at the output of the buffer 340 is an eight-bit binary code with the three most significant bits (MSB's) of the window bottom representing that section of the strip memory containing the bottom cell of the line block that is to be routed into the line block memory controller 50. These bits appearing on the channel 346 are applied to the selector gates 336 and 338 to be used to select the appropriate sections of data input thereto. As implemented, the selector gate 338 selects the section of the line block video data containing the bottom cell and the selector gate 336 selects the section of the line block video data immediately above the section containing the bottom data.

During the first scan of the next sixty-four scans, data selected by the selector gate 336 is routed to a random access memory 348 while the selected data from the selector gate 338 is routed to a random access memory 352. Data stored in the random access memories 348 and 352 is sequentially scanned and transferred to a selector gate 356. While data is being written into the memories 348 and 352, data from the preceding sixty-four scans is being read from random access memories 350 and 354. Data from the selected random access memories, by operation of the selector gate 356, is routed to a serial-to-parallel converter 358 and from the converter 358 to a latch gate 360.

The random access memories 348, 350, 352 and 354 alternate between operating in a read mode and a write mode on a scan by scan basis as established by a scan rate clock (SRC) applied to a selector gate 362 and a scan rate clock (SRC) applied to a selector gate 364. To establish the write mode operation of the random access memories, a write counter 366 provides address data to the selector gates 362 and 364 over a channel 368. The write counter 366 is incremented by a clock signal (CCLK) applied on a line 370.

During the read mode, the read counter is incremented 64 counts for each scan time thereby allowing data from sixty-four scans to be written into the random access memories simultaneously during a scan time. For the read mode, a read counter 372 provides address information to the selector gates 362 and 364 over a channel 374. The read counter is also incremented by the clock signal (CCLK) applied on the line 370. The read counter provides the address information through the selector gates 362 and 364 during the read mode of the random access memories.

The read and write addresses are alternately cycled on a scan basis on the output channels 376 and 378 coupled to the random access memories as illustrated. The read counter 372 is preset each scan with the five least significant bits (LSB's) from the buffer 340 in response to a signal BS applied to the read counter over a line 380. The least significant bits applied to the counter 372 represent the strip memory address which contains the bottom cell of the read window. This counter is also incremented at a cell scan rate so that sixty-four cells are read from the strip memory each scan beginning with the window bottom cell.

Data clocked to the serial-to-parallel converter 358 by the clock signal (CCLK) is converted from the random access memory format into a thirty-two bit wide word rounted to the latch 360. Every eight cell times the words in the converter 358 are transferred to the latch 360 by a load signal (LDL). While the serial-to-parallel converter 358 is being loaded with the next eight cells, the cells previously transferred to the latch 360 are routed to the line block memory controller 50. This process repeats itself for sixty-four scans at which time new window bottom parameters are loaded to renew the operation of the extraction registers 52 for a new segment of video data.

Figure 18:
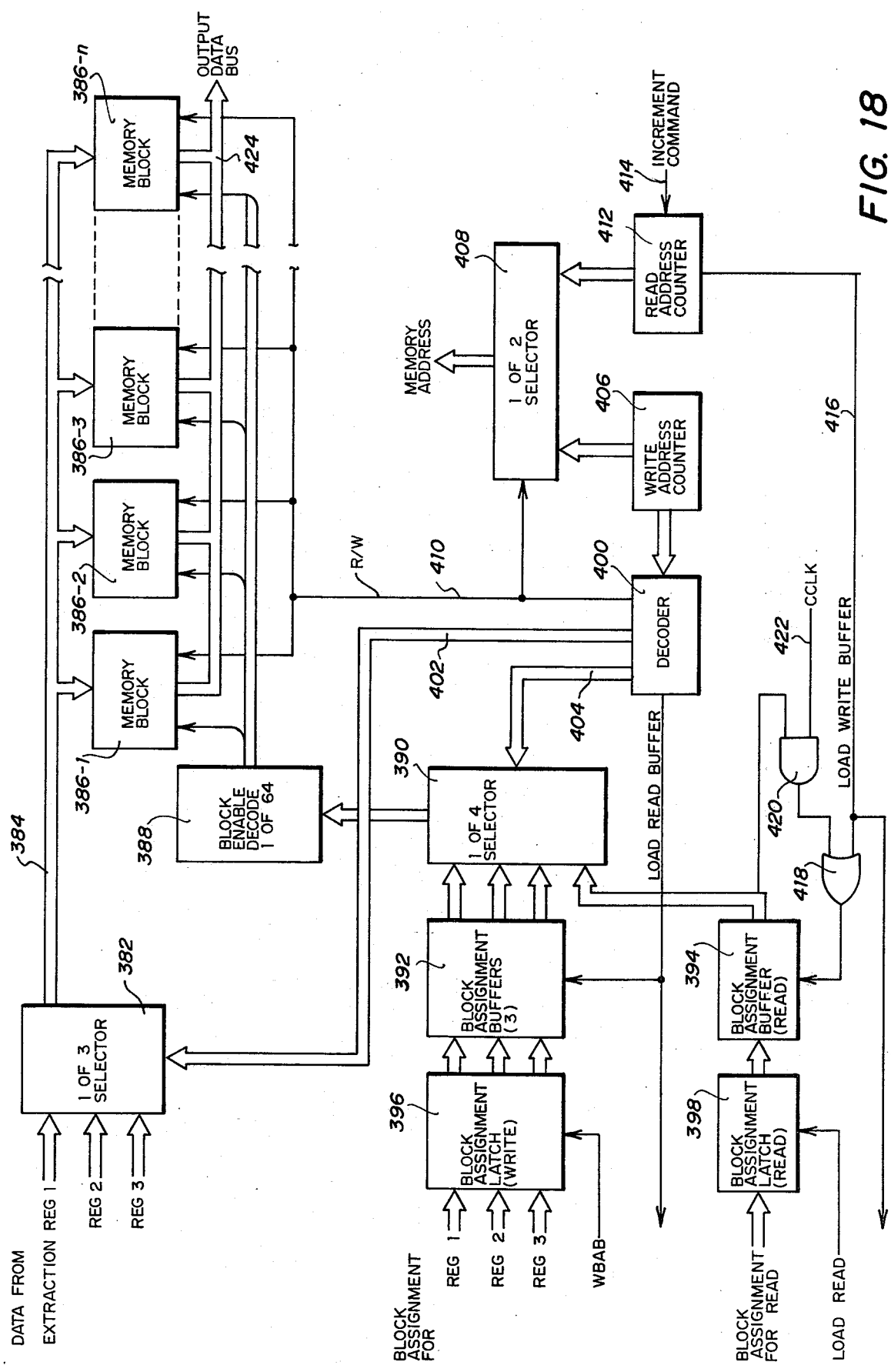
FIG. 18 is a block diagram of the line block memory controller of the memory electronics of FIG. 2.

Referring to FIG. 18, data extracted from the strip memory 48 by the extraction registers 52 is routed to the line block memory controller 50 which is organized into multiple blocks of video data bits enough to store sixty-four scans by sixty-four cells per scan by four bits per cell. In the system being described, three extraction registers, as shown in FIG. 17, are utilized thus necessitating three memory blocks that are utilized simultaneously. Video data from the extraction registers is input to a selector gate 382 and routed on an input data bus 384 to one of the memory blocks 386-1 through 386-n. For a typical two line storage system, sixty-four memory blocks are utilized allowing enough storage to retain two six inch lines of video data. Each of the memory blocks 386-1 through 386-n is organized in a matrix of 512 words by 32 bits per word and each block is independent of the next so that any number blocks can be written into simultaneously. Internally, each memory block 386-1 through 386-n is composed of random access read/write memories that are capable of being addressed in any sequence.

Address signals applied to the memory blocks 386-1 through 386-n is routed through a block enable decode register 388 addressed from a selector gate 390. Three inputs to the selector gate 390 are coupled from a block assignment buffer 392 and a fourth input is received from a block assignment read buffer 394. The block assignment buffer 392 is coupled to a block assignment latch 396 receiving block assignment codes applied to inputs thereto. The block assignment read buffer 394 is coupled to a block assignment read latch 398 receiving a read code assignment.

The selector gates 382 and 390 are controlled by the output of a decoder 400 over selector control lines 402 and 404, respectively. The decoder 400 is addressed from a wire counter 406 also applying an address to a selector gate 408. Each of the memory blocks 386-1 through 386-n and the selector gate 408 receives a read/write control signal on a line 410 from the decoder 400. Also applied to the selector gate 408 is a read address from a read address counter 412 that is incremented by a command on a line 414 and provides a load write buffer signal on a line 416. The load read buffer signal on the line 416 is applied to one input of an OR gate 418 having a second input from an AND gate 420. Two inputs to the AND gate 420 are the most significant bits from the read buffer 394 and the clock signal (CCLK) on a line 422. An output from the OR gate 418 is applied to the read buffer 394.

In operation of the line block memory controller 50, line block memory assignments from the line tracker microprocessor 78 are applied to the assignment latch 396 prior to data for a scan segment appearing at the output of the extraction register 52. The line block memory assignment code for each of the extraction registers applied to the latch 396 is a seven bit code with bits $2^0$ through $2^5$ identifying the storage elements of the memory blocks 386-1 through 386-n. The most significant bit of the line block memory assignment code, that is, bit $2^6$, is used to identify that no data is to be retained for the associated extraction register during the present scan segment time. This last bit is used to disable all the memory block enable lines from the decoder 388 during a particular extraction register's normal write cycle.

When the extraction register data for a given set of memory elements becomes available, the block assignment codes are transferred to the assignment buffer 392 by the signal WBAB applied to the latch 396. This signal is also one of the interrupts to the line finder microprocessor 78. From the buffer 392, the selector gate 390 routes one of the line block assignment codes to the line block decoder 388 which enables the appropriate line block memory.

Once every eight cell times, new data is available at the selector gate 382 from the extraction registers 52. During this eight cell period three write cycles and one read cycle are executed; each cycle requires two cell times. For the first write cycle, data from the extraction register 1 is routed to the input data bus through the selector gate 382 with the corresponding line block assignment code routed to the selector 390 to enable the appropriate line block memory 386-1 through 386-n. The next two subsequent write cycles perform a similar operation for extraction register 2 and extraction register 3, respectively.

During the three write cycles, a write address from the address counter 406 is routed to the memories through the selector gate 408. This write address is also decoded in the decoder 400 with the bits $2^1$ and $2^2$ providing selector address data to the selector gates 382 and 390. Write address bits $2^3$ through $2^{11}$ from the decoder 400 provide the 512 storage element addresses to the memory blocks 386-1 through 386-n to access a complete block. The bits $2^1$ and $2^2$, as decoded by the decoder 400 from the counter 406, are also ANDed together to provide the read/write control on the line 410 to the memory blocks 386-1 through 386-n. These same ANDed bits also enable the selector gate 408 to select the output of the write address counter 406 over the output of the read address counter 412.

After the three write cycles are executed, the read cycle is initiated. The format for the read block assignment is similar to the format of the line block memory assignment to the latch 396. The most significant bit disables the memory enable lines to the AND gate 420 and the OR gate 418 during the write cycle. This most significant bit is also routed to the read window select formatter 54 thereby holding that circuit in a wait mode. The most significant bit of the read block assignment also allows the read block assignment buffer 394 to be continually loaded with output data from the latch 398. This enables a read cycle to be initiated whenever requested by the line finder microprocessor 78.

When any one of the memory blocks 386-1 through 386-n is to be unloaded on the output data bus 424 the appropriate read code is transferred from the latch 398 through the buffer 394 to the selector gate 390. The address is decoded in the decoder 388 to one of the block enable lines.

A line block enable code from the decoder 388 enables one of the memory blocks 386-1 through 386-n, the read/write controller on the line 410 identifies that the read cycle has been selected, and the read address counter 412 provides an address routed through the selector gate 408 to the appropriate memory block 386-1 through 386-n.

As explained, the counter 412 is incremented by a command on a line 414, with this command originating in the read window select formatter 54 to identify the time when output data on the bus 424 has been transferred to the read electronics 58 and that the next data word should be made available to the formatter. The read address counter 412 is incremented to 512 at which time it loads the block assignment buffer 394 through the OR gate 418 with a new line block code. This same signal as applied to the OR gate 418 from the counter 412 provides an interrupt to the line tracker microprocessor 78 identifying that the block assignment latch 398 should be updated.

Video data from the line block memories 386-1 through 386-n is available to the read window select and formatter 54 that functions to select the portion of each block of video data to be routed to the normalizer 60. The read window selector formatter 54 also formats the video data into a serial bit stream and provides a data clock when valid data is output to the normalizer 60. Also provided to the normalizer 60 by the formatter 54 is a begin read scan signal.

Figure 19:
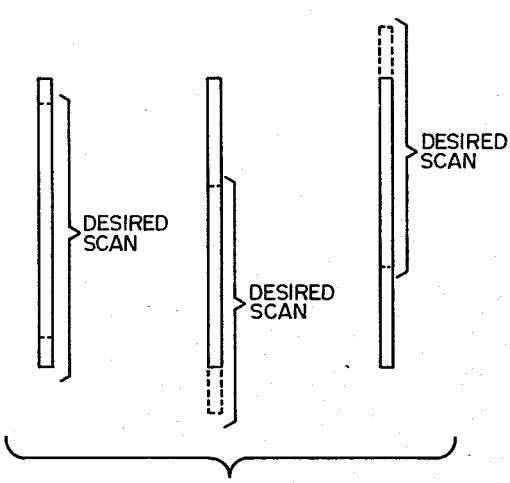
FIG. 19 is an illustration of possible positions of scan data available from the line block memory.

Referring to FIG. 19, there is illustrated three possibilities that can exist when a read scan segment is to be extracted from block memories 386-1 through 386-n. FIG. 19-A illustrates where the scan available from the line block memory is totally within the scan segment where all required data is available to the formatter 54. In FIG. 18-B, some cells below the line block scan stored in the line block memory are required for processing to the read electronics. These cells, while not actually available, are forced to appear as white cells by operation of the formatter 54. This is accomplished by producing white data cells. FIG. 18-C is the opposite situation of FIG. 18-B where cells above the line block scan in a line block memory are required for processing to the read electronics 58, but are not available. Again, those cells that are not available are forced to appear as white cells by generating pseudo value white cells. The conditions illustrated in FIGS. 18-B and 18-C, while not commonly occurring, may occur with large character sizes and excessive line skew.

Figure 20:
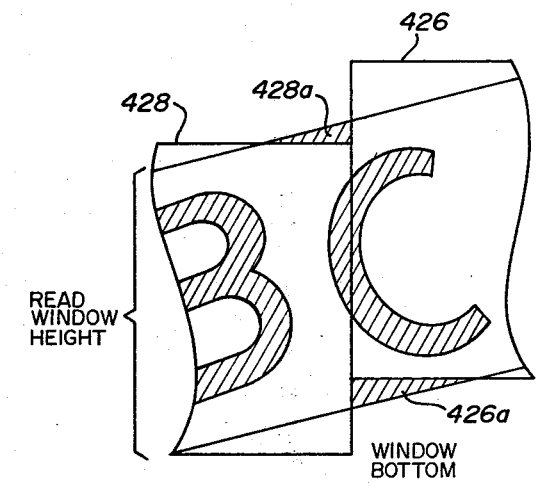
FIG. 20 is an illustration of two adjacent blocks of data (multiple scans stored as a unit) in the line block memory on a skewed line.

Referring to FIG. 20, there is illustrated the condition where pseudo value white cell data must be generated to complete a line scan segment. Video data for the cells within the block outlines 426 and 428 are stored in elements of the line block memories 386-1 through 386-n. Due to the excessive skew of the characters within the read window an area of video data below the block 426 and above the block 428 is not available from the line block memories. These cells are forced to appear as white video data for processing to the read electronics 58.

It should be noted that an entire line block scan is accessed by bytes of eight cells, whether or not the cells are utilized by the read electronics. This provides an orderly unloading of the line block memory controller 50.

Figure 21:
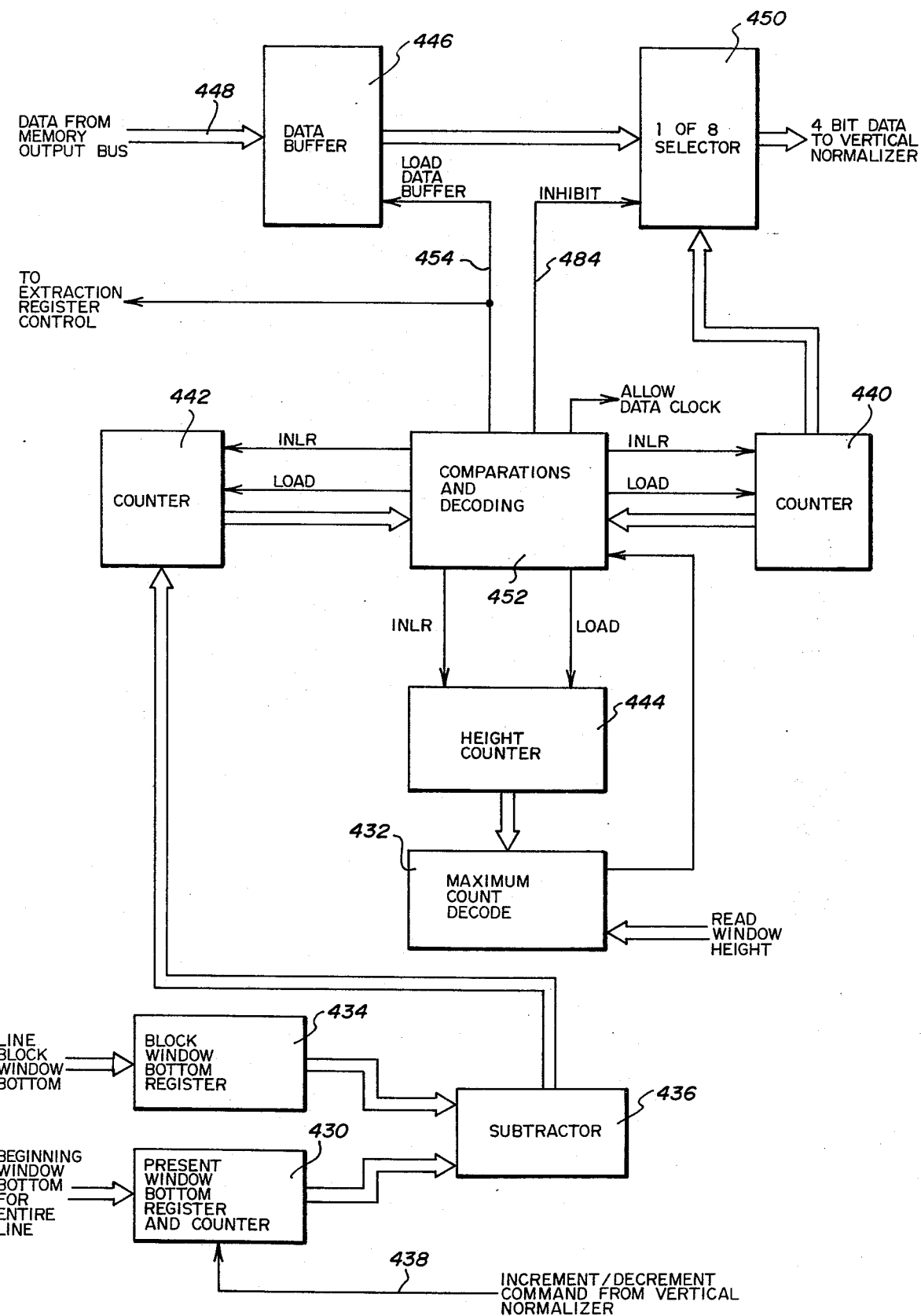
FIG. 21 is a logic schematic of the window select and data formatter of FIG. 2.

Referring to FIG. 21, there is shown a logic diagram of the window select and data formatter 54. Prior to the unloading of a line of data, the address of the beginning window bottom is loaded into a register counter 430. This value is representative of the position of the lower cell in the scan to be read from the line block memories 386-1 through 386-n. Data representing the window height from the line tracker microprocessor 78 is routed into a decoder 432 to determine the height of each scan to be formatted. Also coupled to the formatter 54 is the address of the line block window bottom applied to a bottom register 434. The line block window bottom data to the register 434 is the present line block window bottom and is changed each time a new line block of video data is accessed from the line block memory 50.

Both the register counter 430 and the register 434 are output to subtractor logic 436 that provides the difference between the present line block window bottom and the present read window bottom. After the routing processor is started, the beginning window bottom data to the counter 430 is the present read window bottom.

The data to the counter 430 is altered periodically by an increment/decrement command from the vertical section of the normalizer 60 over a line 438. The rate at which this register counter 430 is changed in value is a function of the skew angle of the read window. This register is implemented by a conventional up/down counter.

As shown in FIG. 21, the window select and data formatter includes counters 440, 442 and 444. The counter 440 is utilized to insure proper and orderly scan buffer loading and serializing of the scan data. The counter 442 contains the position at which the read scan bottom should begin relative to the line block scan bottom. The height counter 444 insures that the correct number of cells are output for each scan. The interrelationship of these counters will be described.

At the beginning of each scan, the counter 442 is loaded with the difference between the present window bottom and the present line block window bottom as provided at the output of the subtractor 436. At the same time that the counter 442 is loaded with the difference from the subtractor 436, the counter 440 and the height counter 444 are reset to zero.

At this time data from the line block memory controller 50 is input to a data buffer 446 over channels 448. If the counter 442 has a value less than zero, this indicates that the data below the lowest cell transferred into the buffer from the line block memory is required. In this case, the data output of the buffer 446 is forced to zero in a selector gate 450. This is accomplished by inhibiting the outputs of the selector 450 which functions as a serializer for the data buffer 446.

At this time, a data clock is generated and the counter 442 and the height counter 444 are incremented. Incrementing the counters 442 and 444 continues until the value of the counter 442 is equal to or exceeds the zero level. So long as the counter 442 has a value less than zero, the output of the selector gate 450 continues to force output data to the normalizer 60 at a zero or video white level. This condition is illustrated in FIG. 20 by the area 426a. Also, data forced to have a pseudo value white level as illustrated in FIG. 19-B.

When the counter 442 reaches a level equal to zero or greater, a comparison takes place in a comparator and decoder 452 between the count level in the counter 442 and the counter 440. If the value of the counter 442 is greater than the value of the counter 440, then the bottom read scan cell is about the bottom of the line block. Under these conditions, the counter 440 is incremented from the comparator and decoder 452 until it has a count level equal to that of the counter 442.

During the time interval in which the counter 440 is incremented, the data buffer 446 is loaded with the next scan from the line block memory controller 50. The load signal is generated on a line 454 from the comparator and decoder 452 and is also applied to the extraction register controls. The signal to the extraction registers 52 advances the line block memory address.

When the value of the counter 442 is at a level equal to the value of the counter 440 the latter is tested to determine if it is less than the total number of cells in a data block. In the example previously discussed, the counter 440 is tested to see if it is less than 64. Concurrently, the height counter 444 is tested to determine if the count level has reached a maximum number of cells in a data block. When both the counters 440 and 444 are at the maximum count level, data is output to the normalizer 60 through the selector gate 450. A data clock is now enabled in the counter 400 and the height counter 444 is incremented, and for every eight cell times the data buffer 446 is loaded with a new scan.

This operation continues until one of two conditions are met; first, when the counter 440 has a value equal to its maxiumum level thereby indiating that the top cell of the data block has been output. If this first condition is met and the height counter 440 has not reached its maximum level, it indicates that cells above the highest cell in the data block are required. This condition is illustrated in FIG. 19-C.

A data clock is enabled and data is forced white from the selector gate 450 and the height counter 444 is incremented until it reaches its maximum count. During this time data, routed to the normalizer 60, is forced to a white level. When the height counter 444 reaches its maximum count level a new scan unload sequence begins.

The second condition that terminates the incrementing of the counters 440 and 444 is when the height counter 444 reaches its maximum count level before the counter 440 reaches its level. This condition indicates a read scan is completed, but the line block scan is not completely loaded. For this condition, data blocks and data transfer are inhibited and the counter 440 is incremented until it reaches its maximum level. Again, every eighth cell time the data buffer 446 is loaded from the line block memory controller 50 so that a complete scan is unloaded from the line block memory. This permits synchronization of the scan to be maintained. When the counter 440 reaches its maximum count level, a new scan unload sequence is initiated.

Figure 22:
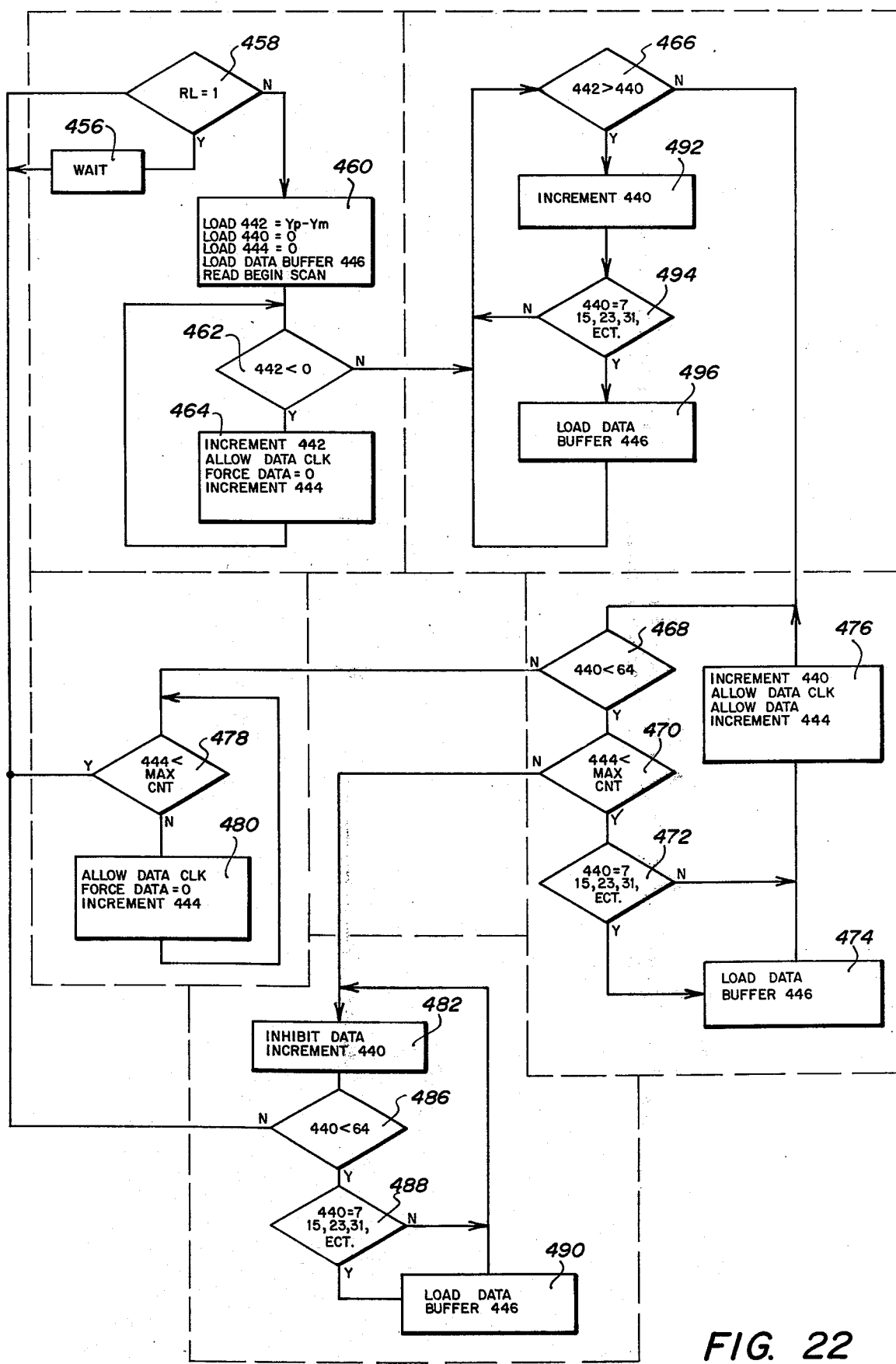
FIG. 22 is a flow diagram for the window select logic of the formatter of FIG. 21.

Referring to FIG. 22, there is shown a flow diagram of the sequence of operation of the window selector data formatter logic wherein the system initially is held in a wait mode 456 until the most significant bits from the buffer 394 of FIG. 18 are no longer equal one as indicated by a negative response from the inquiry 458. The sequence of operation advances to step 460 where the counter 442 is loaded with the difference between the registers 430 and 434 as output from the subtractor 436. Also, the counter 440 and the height counter 444 are reset to zero and data is loaded into the data buffer 446.

The sequence of operation advances and if the inquiry 462 indicates that the count level of the counter 442 is less than zero, then the step 464 is completed incrementing the counter 442 and also allowing a data clock to force pseudo value white video from the selector gate 450. At this time, the height counter 444 is incremented.

When the value of the counter 442 is equal to or greater than zero the sequence next checks to determine whether the value in the counter 442 is greater than the value of the counter 440. When the level of counter 442 is greater than the level of counter 440 the inquiry 466 provides a negative response and the sequence advances to an inquiry 468. At this time a determination is made whether the value in the counter 440 is less than its maximum cell block count.

If the value of the counter 440 has not reached its maximum level, the sequence advances to an inquiry 470 to evaluate if the height counter 444 has reached its maximum count level. If this inquiry provides a positive response, the sequence advances to the inquiry 472 which evaluates the count level in counter 440 and at preestablished count levels advances the sequene to the step 474 where data is loaded into the buffer 446. The sequence then advances to an incrementing step 476 wherein the counters 440 and 444 are incremented and the sequence returns to the inquiry 468.

If the value of the counter 440 is at its maximum level producing a negative response from the inquiry 468, the sequence advances to an inquiry 478 to determine the count level of the height counter 444. If the count value in the counter 444 is less than its maximum level, the sequence advances to the step 480 which increments the counter 442 and forces pseudo white video data from the selector gate 450 to the normalizer 60. A positive response to the inquiry 478 returns the sequence to the wait mode.

A positive response to the inquiry 468 and a negative response to the inquiry 470 advances the sequence to a step 482 which inhibits data from the selector gate 450 by an inhibit signal generated from the comparator and encoder 452 on a line 484. The sequence of FIG. 22 advances to an inquiry 486 to determine if the value of the counter 440 has reached its maximum level. Until the counter 440 reaches its maximum level, the sequence advances to an inquiry 488 which is similar to the inquiry 472 and at preestablished count levels of the counter 440 advances the sequence to the load data buffer step 490. During the step 490, data from the line block memory controller 50 is loaded into the data buffer 446. The sequence then recycles to the step 482 which is also reached by a negative response to the inquiry 488.

Returning to the inquiry 466, if the value of the counter 442 is greater than the counter 440, a positive response is generated to advance the sequence to a step 492 that causes a clock to increment the counter 440. The sequence advances to the inquiry 494 and at preestablished count levels advances the sequence to a step 496 to load data into the buffer 446. Except for the preestablished count levels, and upon completion of the loading of data into the buffer 446, the sequence recycles to the inquiry 466.

Thus, the window select formatter 54 receives scan data from the line block memory controller 50, evaluates the location of the scan window and formats output video data to the normalizer 60. Timing of the operation of the various components of the system described is important to provide continuous processing of data from the document 10 to the read electronics 58.

Figure 23:
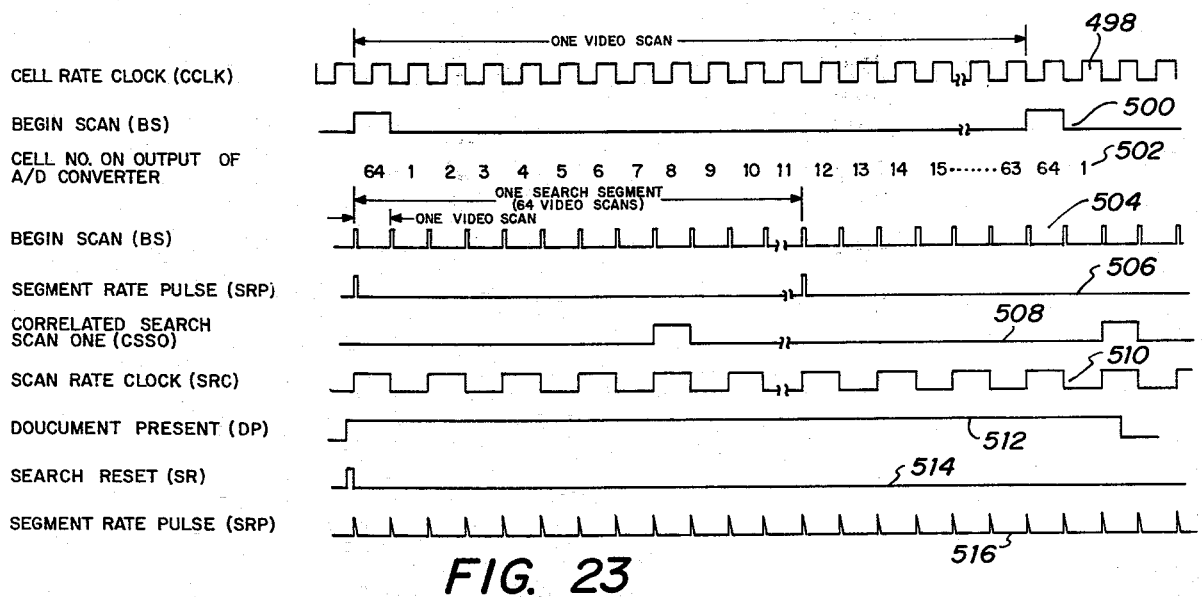
FIG. 23 is a series of timing pulses illustrating the basic system timing for the processing of pattern data.

Referring to FIG. 23, there is shown some of the basic timing signals for operation of the system of FIG. 2. The cell rate clock (CCLK) is illustrated by the pulse waveform 498 with the number of pulses for one video scan defined between the brackets. At the beginning of each video scan, a begin scan (BS) signal is generated as illustrated by the waveform 500. The relationship between the cell number on the output of the analog-to-digital converter 44 and the begin scan signal is illustrated by the number sequence of line 502.

Illustrated at the line 504 is a series of begin scan signals utilizing a different timing base than the waveform of line 500. One begin scan signal occurs for each video scan and the video data for each cell for one scan is stored in the strip memory 48 and processed through the search correlator 68 to the search analyzer 72. As explained, sixty-four video scans of sixty-four cells are compressed to one seach segment as illustrated in FIG. 6. It should be noted that both the cell rate clock (CCLC) and the begin scan pulse are originated in the video electronics and are the basic clocks from which all other signals are derived.

Once each sixty-four video scan, a segment rate pulse, a illustrated on line 506, is generated. The segment rate pulse is generated at the beginning of each search segment and enables the further processing of data compressed into a search segment. Also derived from the cell rate clock is a correlated search scan one (CSSO) signal as illustrated on the line 508 and the scan rate clock (SCRC) as illustrated on the line 510.

A document present signal (DP), as illustrated on the line 512, is generated by a photocell in the video electronics and identifies the presence of a document at the data lift station. The search reset signal (SR) of line 514 is derived from the leading edge of the document present signal. All search functions are reset by this signal. The trailing edge of the search reset signal is utilized by the line tracker microprocessor 78 to indicate no more data from the document 10 will be available for processing. Line 516 illustrates the relationship between the segment rate pulse (SRP) with respect to the document present signal for comparison to the begin scan signal on the line 504.

Referring to FIG. 24, there is shown a timing diagram for the extraction register of FIG. 16 including the begin scan signal on line 500, the segment rate pulse on line 516 and the scan rate clock on line 510. This illustrates the interrelationship between the three timing signals and also the relationship between the timing signals and the read/write function of the registers 334-1 through 334-n. As shown in lines 518 and 520, as scan one is being written into the strip memory 48, scan sixty-four is being read to the extraction registers 52.

The scan rate clock is also shown on line 522 on an expanded time base with the begin scan clock on the line 524 on the same expanded time base. At the trailing edge of each beginning scan pulse a load output latch (LDL) pulse is generated to the latch 360 of FIG. 17 as shown in line 526. The line 528 indicates which cells are being read between subsequent latch pulses. Thus, at the trailing edge of the latch pulse 526a, all data from cells 56–63 of the previous scan have been loaded into the latch 360. At that time the video data is read and routed to the line block memory controller 50. At the trailing edge of the latch pulse 526b, all the video data from the cells 0–7 of the scan currently being read have been loaded into the latch 360 and are then read to the line block memory. This sequence of operation continues through the extraction registers where video data from every eight cells is sequentially loaded into the latch 360.

Figure 25:
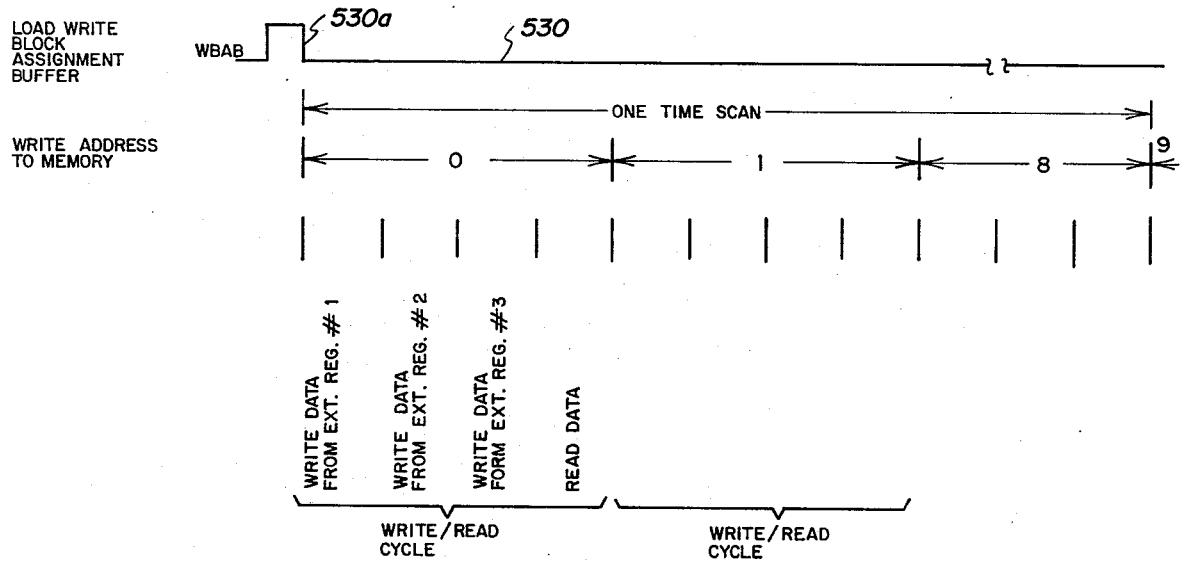
FIG. 25 is a timing diagram for the transfer of scan data into the line block memory.

Referring to FIG. 25, there is shown a timing diagram of the line block memory controller 50 wherein the load write block assignment buffer (WBAB) pulse as applied to the latch 396 of FIG. 18 is illustrated on line 530. The trailing edge of the pulse 530a occurs at the beginning of one scan time which is divided into eight equal time segments. As explained previously, during each of the eight time segments, data from each of the extraction registers is routed through the selector gate 382 to the block memories 386-1 through 386-n. During the fourth portion of each of the eight segments, data is read from the block memories 386-1 through 386-n to the read window select and formatter 54. This read/write sequence of operation thus occurs eight times for each scan rate clock pulse.

Figure 27:
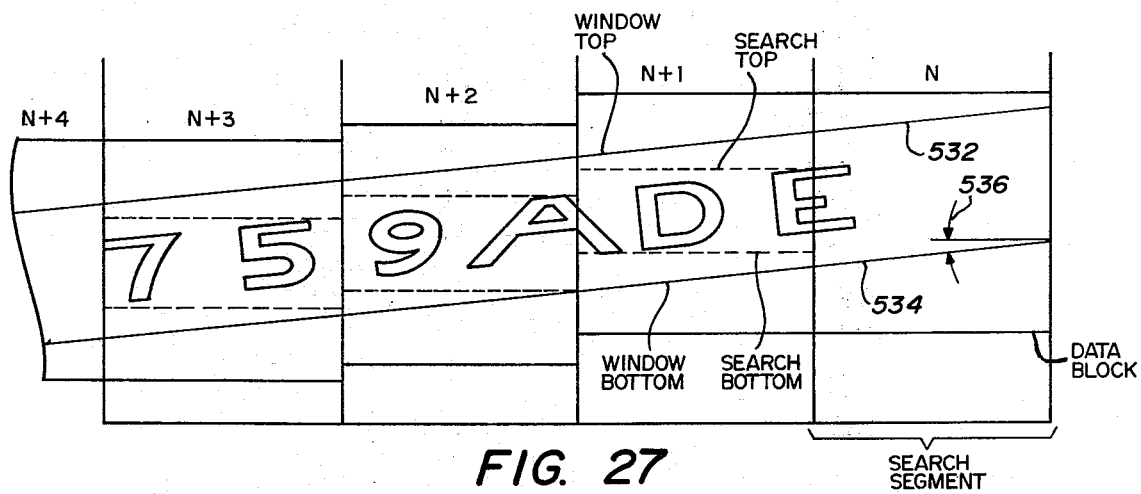
FIG. 27 is an illustration of five adjacent blocks of data in the line block memory for transfer to the window select and formatter logic of FIG. 2.
Figure 26:
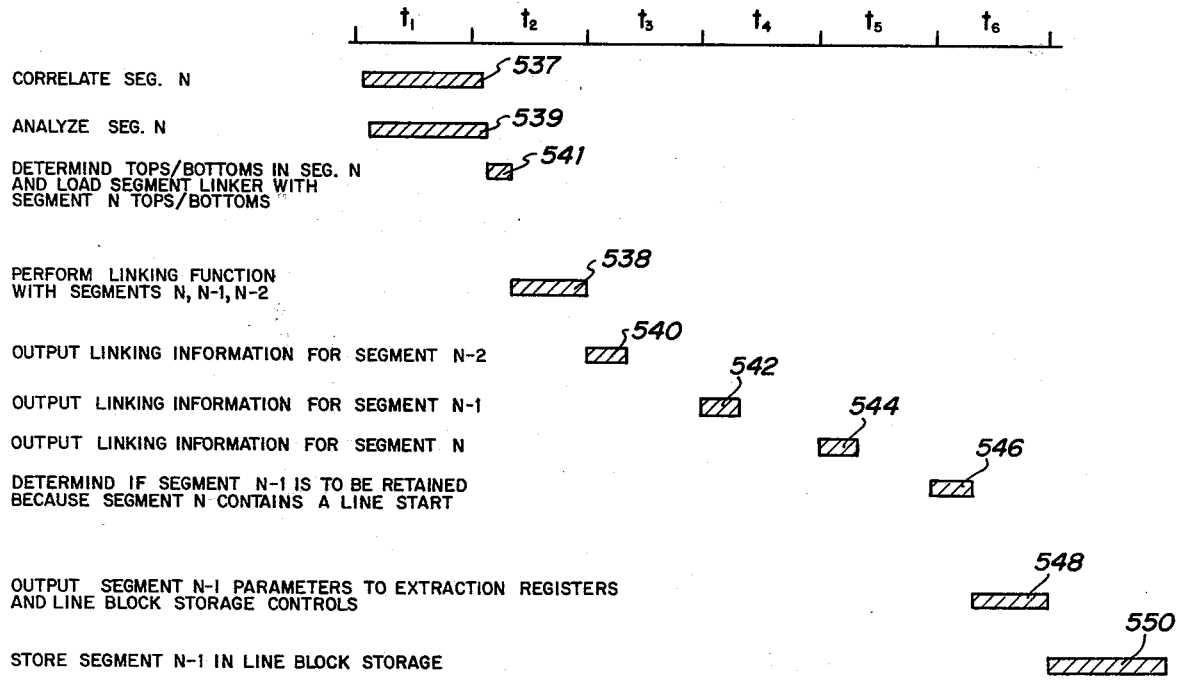
FIG. 26 is a time versus processing event chart for the processing of data and the transfer thereof by the apparatus of the present invention.

Referring to FIG. 26, there is shown a general sequence of the pocess function versus timing as a means of further explanation of an example of control parameters of the system of the present invention. Referring also to FIG. 27, there is shown search segments N through N+4 containing the line character "759ADE". The dashed lines in the segments N+1, N+2 and N+3 represent the data bottoms and data tops as determined by the search electronics. Search segments N and N+4 contain insufficient data to allow top and bottom locations to be determined. With the system as described, the search segment N+1 was determined to contain line information, thereby necessitating the scan data in search segment N to be retained. Because the bottom and top of this search segment could not be determined, it is forced by the read window select and formatter 54 to have the same block window bottom as the search segment N+1. Scan data within the memory blocks 2, 3 and 4 for the search segments N+1, N+2 and N+3, respectively, are retained since it has been determined that each of these memory blocks contains top and bottom information. The video scans of the search segments N+4 are retained in memory block No. 5 because it is adjacent to the scan data of memory block No. 4 with the block window bottom forced to have the same value as the previous memory block.

While the video data in the memory blocks (each block being sixty-four cells in height and sixty-four scans in width) are retained in the line block memory and controller 50, having previously been identified as a line of interest, the window height, the beginning window bottom and the skew angle are calculated from the top and bottom information by the microprocessor 78. When this line of data, as illustrated in FIG. 27, is read from the line block memory and controller 50 into the normalizer 60, the data between the window top line 532 and the window bottom line 534 are selected and routed to the normalizer. The first scan stored from the memory block No. 1 is the beginning scan of the line "795ADE". The window bottom is altered by incrementing the counter 442 based on the skew angle 536.

Referring to FIG. 26, there is shown six equal time segments. During the time segment $t_1$, time frame 537, the video data of the search segment N of FIG. 27 is correlated in the search correlator 68. During the time frame 537, the data from the search correlator 68 is analyzed by the search analyzer 72 and compressed into a single search segment. During the time period $t_2$, time frame 539, the search segment N is evaluated in the top/bottom detector 74 to determine the locations of the tops and bottoms of lines of patterns in the search segment N.

With the completion of the operation of the top/bottom detector 74, a linking function is performed with two previous segments by the segment linker 76 during the time period 538. Output linking information for the second proceding search segment is routed during a time interval 540 and linking information for the next preceding search segment is routed during a time interval 542 while linking information for the search segment N is routed to the line tracker microprocessor 78 during a time interval 544.

At the start of the time interval $t_6$, the microprocessor 78, during a time interval 546, evaluates to determine if the search segment immediately preceding the segment N is to be retained since the search segment N contains a line start. During a time interval 548 control signals are processed to the extraction registers 52 and the line block memory and controller 50 for the search segment immediately preceding the segment N.

During a time interval 550, the scan data in the strip memory 48 for the memory block preceding the segment N is routed to the line block memory controller 50.

When the search sigment N+1 is being correlated the processing of information during each of the time intervals of FIG. 26 is sequenced to the next search segment. This processing continues during the document present pulse of line 512 of FIG. 23.

Data routed to the read electronics 58 is input to the normalizer 60. The normalizer in response to parameter data from the line tracker microprocessor 78 reduces the area of an acquisition zone by a predetermined amount, this amount being referred to as the normalization ratio. The normalizer 60 also receives skew correction parameters from the line tracker microprocessor 78 to correct the skew of line data such as shown in FIG. 27.

Following normalization and skew correction, the video data for a line of patterns on the document 10 is routed to the correlator 62. The correlator 62 determines the black/white condition of the cell data from the normalized video information. The black/white video data is then transferred to the video storage 56 which is a memory used to buffer correlated lines of read data for later presentation to a character recognition system. The character recognition or pattern recognition unit may be any of the well known and commerically available systems.

While only one embodiment of the invention, together with modification thereof, has been described in detail herein and shown in the accompanying drawings, it will be evident that various further modifications are possible without departing from the scope of the invention.

What is claimed is:

1. A single read station acquisition system for character recognition of multiline data using a self-scan photocell array as the reading station, said system including: means for reading and temporarily strong multiple lines simultaneously, means for compressing the read data into search segments to evaluate the top and bottom positions of character line, means for determining line linkage between the elements of one search segment of compressed data and the elements of the preceding search segment for future processing, line tracker means for extracting character lines from a temporary storage for transmission to a line block memory, and means for transmitting the data in the line block memory to a character recognition unit.

2. The system according to claim 1 including a plurality of independent line block memories so that a set of blocks can be storing information from one document while a data from a previous document is being read out of memory.

3. The system according to claim 1 wherein the means for reading and storing multiple lines includes means for storing multiple lines in parallel.

4. The system according to claim 1 including means for deskewing lines of characters as the character lines are transferred from the line block memory to character recognition unit.

5. A single read station acquisition system for character recognition of multiline data on a document comprising; a self-scan photocell array extending substantially the entire width of the document, search electronic means and memory means to receive output signals from the scan array, the search electronic means compressing the data into search segments to evaluate the top and bottom position of character lines and evaluating the line linkages between the elements of one search segment of compressed data and the elements of the preceding search segments, a line tracker for processing the search segments and selecting character lines from the memory means, and means for selecting information from the selected character lines to be processed in a character recognition unit.

6. The system according to claim 5 wherein the search electronic means includes search correlators and analyzers and a top/bottom detector.

7. The system according to claim 5 wherein data acquisition occurs when the document is moving past the scan array.

8. The system according to claim 5 wherein each cell of the photocell array has an output which is either black or white depending on the data scanned and that a black/white decision for each cell is determined by summing nine consecutive samples of each cell.

* * * * *